United States Patent [19]
Ozaki et al.

[11] Patent Number: 5,642,709
[45] Date of Patent: Jul. 1, 1997

[54] ENGINE POWER TRAIN CONTROL METHOD AND CONTROL APPARATUS FOR A VEHICLE

[75] Inventors: Naoyuki Ozaki, Hitachinaka; Matsuo Amano, Hitachi; Hiroshi Ohnishi, Hitachinaka; Toshimichi Minowa, Mito, all of Japan

[73] Assignee: Hitachi, Ltd., Tokyo, Japan

[21] Appl. No.: 506,484

[22] Filed: Jul. 25, 1995

[30] Foreign Application Priority Data

Jul. 25, 1994 [JP] Japan .................. 6-172292

[51] Int. Cl.⁶ .................. F02D 41/18; F02D 41/26
[52] U.S. Cl. .................. 123/361; 123/478; 123/486
[58] Field of Search .................. 123/478, 480, 123/486, 492, 493, 679, 687, 361, 399; 477/110

[56] References Cited

U.S. PATENT DOCUMENTS

| | | | |
|---|---|---|---|
| 4,739,483 | 4/1988 | Ina et al. | 123/480 |
| 5,190,008 | 3/1993 | Yamasaki et al. | 123/486 |
| 5,209,213 | 5/1993 | Miyashita et al. | 123/687 |
| 5,224,454 | 7/1993 | Miyashita et al. | 123/493 |
| 5,295,416 | 3/1994 | Miyashita et al. | 477/110 |
| 5,363,826 | 11/1994 | Takaoka | 123/486 |

FOREIGN PATENT DOCUMENTS

| | | |
|---|---|---|
| 61-187545 | 8/1986 | Japan . |
| 62-55430 | 3/1987 | Japan . |
| 06-21594 | 3/1994 | Japan . |
| 06-87358 | 3/1994 | Japan . |
| 06-173731 | 6/1994 | Japan . |
| 2253655 | 9/1992 | United Kingdom . |

*Primary Examiner*—Willis R. Wolfe
*Attorney, Agent, or Firm*—Antonelli, Terry, Stout & Kraus, LLP

[57] ABSTRACT

An engine power train control method and control apparatus for a vehicle having an engine and an automatic transmission is capable of quickly changing an air-fuel ratio to meet the requirements for exhaust gas without producing shocks and without reducing engine torque. An air-fuel ratio command value is varied stepwise for transition between an air-fuel ratio for lean-burn operation and a stoichiometric air-fuel ratio, and at the same time, the period following the completion of the stepwise variation of the air-fuel ratio command value, a basic fuel amount fed to the engine is varied stepwise from a value determined according to the air amount and an engine speed to a value determined according to a position of an accelerator pedal of the vehicle and the engine speed. In this way, shocks do not occur and the operability is improved, because the engine torque remains substantially constant through the air-fuel ratio transition.

20 Claims, 18 Drawing Sheets

ENGINE POWER TRAIN CONTROL METHOD AND CONTROL APPARATUS FOR A VEHICLE

FIELD OF THE INVENTION

The present invention relates to a method of and an apparatus for controlling an engine power train including an engine for a vehicle which can operate on a lean air-fuel ratio and which drives the vehicle through an automatic transmission.

BACKGROUND OF THE INVENTION

Active efforts have been made to develop an engine capable of operating on a lean air-fuel ratio larger than a stoichiometric air-fuel ratio to improve fuel consumption, while also suppressing harmful products included in exhaust gas from the engine. A method of controlling the air-fuel ratio previously proposed in Japanese Application Laid-open No.52825/1978 changes the stoichiometric air-fuel ratio to a lean air-fuel ratio when the operating condition of the engine is within a predetermined range. This method increases the air-fuel ratio gradually after the load on the engine has increased beyond a predetermined value and decreases the air-fuel ratio gradually to an initial air-fuel ratio when the load decreases. Another method previously proposed in Japanese Application Laid-open No.10224/1976 increases the air-fuel ratio when the load on the engine is in a middle-load region, and controls the air-fuel ratio so that a fuel mixture at the stoichiometric air-fuel ratio or a rich air-fuel ratio is supplied to the engine when the load is in a low-load region or a high-load region, attaching importance to the output power of the engine.

Since the fuel amount is reduced below that of the stoichiometric air-fuel ratio during operation at a lean air-fuel ratio, the engine torque decreases when the air-fuel ratio is increased with the opening of the throttle valve which has been kept fixed. Since the catalyst for reducing the nitrogen oxide (NOx) concentration in the exhaust gas does not function effectively in a state where the air-fuel ratio is other than the stoichiometric air-fuel ratio, lean-burn operation is possible only at the air-fuel ratio that makes the NOx concentration of the exhaust gas lower than an allowable limit; that is, the transition of the air-fuel ratio between the stoichiometric air-fuel ratio and the air-fuel ratio for lean-burn operation must be completed as quickly as possible to satisfy the requirements for a clean exhaust gas.

It is desirable to use an automatic transmission in combination with such an engine to secure easy driving. The gear changing operation of an automatic transmission is controlled according to a shift schedule stored in a memory of a controller. The shift schedule is designed on the basis of the opening of the throttle valve, which is an index of the engine torque, and the vehicle speed ("Motor Fan", San-ei Shobo, p. 29, Dec., 1990). The lockup schedule also is designed on the basis of the opening of the throttle valve and the vehicle speed. The line pressure is controlled according to the opening of the throttle valve so as to transmit the output power of the engine efficiently to the drive shaft.

As mentioned above, the transition between the stoichiometric air-fuel ratio and the air-fuel ratio for lean-burn operation must be quickly completed. However, since the difference between the torque produced when the engine is operating at the stoichiometric air-fuel ratio and the torque produced when the engine is operating at a lean air-fuel ratio for lean-burn operation is about 30%, the vehicle may be shocked and the driver feels that the output power of the engine is insufficient during lean-burn operation, if the air-fuel ratio is changed quickly.

SUMMARY OF THE INVENTION

A first object of the present invention is to provide an engine power train control method and control apparatus capable of quickly changing the air-fuel ratio so as to meet the requirements for exhaust gas content without causing shocks and reducing the engine torque.

Since the engine torque decreases if the opening of the throttle valve is kept fixed while the engine is operating on the lean air-fuel ratio, the timing of changing the speed of the automatic transmission, the timing of lockup and the setting of the line pressure become inappropriate, and shocks due to changing of the speed increase and the operability is deteriorated.

A second object of the present invention is to provide an engine power train control method and control apparatus capable of suppressing shocks due to a changing of the speed during lean-burn operation and of securing satisfactory operability.

With the first object in view, the present invention carries out a transition between the air-fuel ratio for lean-burn operation and the stoichiometric air-fuel ratio by varying an air-fuel ratio command value stepwise, and controls the air amount to change the air amount supplied to the engine stepwise during transition between lean-burn operation and non-lean-burn operation.

The air-fuel ratio command value is determined by retrieving data previously stored in the controller according to the basic fuel amount and the engine speed and interpolating the data. The data to be used depends on whether or not a current air-fuel ratio command value specifies a lean air-fuel ratio. When retrieving and interpolating the data, either the basic fuel amount or the engine speed, or both the basic fuel amount and the engine speed, are rounded off to an optional place before retrieval and interpolation.

In the transition between the air-fuel ratio for lean-burn operation and the stoichiometric air-fuel ratio, the air amount is controlled so that the fuel amount immediately before the transition and the fuel amount after the completion of the transition are equal to each other. When the engine is in a lean-burn operation, the air amount is determined by retrieving data previously stored in the controller according to the position of the accelerator pedal, which is actuated by the driver, and the engine speed, and by interpolating the data. When the engine is in a non-lean-burn operation, the air amount is determined only on the basis of the position of the accelerator pedal.

In a fixed period following the stepwise change of the air-fuel ratio command value, the basic fuel amount is varied stepwise from a value determined on the basis of the air amount and the engine speed to a value determined on the basis of the position of the accelerator pedal and the engine speed. If the position of the accelerator pedal changes to a position outside a predetermined range during the fixed period, the basic fuel amount is determined on the basis of the air amount and the engine speed.

With the second object in view, the present invention uses selectively a gear changing pattern for a lean-burn operation and a gear changing pattern for a non-lean-burn operation.

The gear changing operation and the lockup operation are controlled according to the position of the accelerator pedal, the engine speed and the vehicle speed, and the line pressure of the automatic transmission is determined according to the position of the accelerator pedal and the engine speed while the engine is in a lean-burn operation.

Concerning a system in which the air amount changes according to changes in the air-fuel ratio, the gear changing operation and the lockup operation are controlled according to the position of the accelerator pedal and the vehicle speed, and the line pressure of the automatic transmission is determined according to the position of the accelerator pedal.

When the temperature of the oil in the automatic transmission is lower than a predetermined temperature, or when it is found that a part of the automatic transmission is out of order, the air-fuel ratio command value is inhibited from specifying a lean air-fuel ratio.

Since the air-fuel ratio command value is varied stepwise during transition between the air-fuel ratio for lean-burn operation and the stoichiometric air-fuel ratio, the air-fuel ratio can be quickly changed. Since the air amount is varied stepwise, the variation of the engine torque due to a change in the air-fuel ratio can be suppressed without delay.

Since whether or not the current air-fuel ratio command value specifies a lean air-fuel ratio is taken into consideration when retrieving data for determining the air-fuel ratio, hunting between the lean air-fuel ratio and the non-lean air-fuel ratio due to a change in the basic fuel amount caused by a change in the air amount does not occur. Since either the basic fuel amount or the engine speed, or both the basic fuel amount and the engine speed, are rounded off to an optional place before the retrieval and interpolation of data, the air-fuel ratio can be varied smoothly in the range for lean-burn operation, so that the combustion in the engine can be stabilized.

Since the air amount is controlled so that the fuel amount immediately before the transition between the air-fuel ratio for lean-burn operation and the stoichiometric air-fuel ratio and the fuel amount after the completion of the transition are equal to each other, the engine torque remains constant regardless of the transition of the air-fuel ratio.

Since the air amount for lean-burn operation is determined by retrieving data previously stored in the controller according to the position of the accelerator pedal and the engine speed and by interpolating the data, and the air amount for non-lean-burn operation is determined uniquely according to the position of the accelerator pedal, the engine torque can be properly corrected at every operating point of the engine during lean-burn operation, and the performance of the engine at every operating point is the same as that of a non-lean-burn engine, when a non-lean air-fuel ratio is specified.

Since the basic fuel amount is changed stepwise from a value determined on the basis of the air amount and the engine speed to a value determined on the basis of the position of the accelerator pedal and the engine speed for a fixed period following the stepwise change of the air-fuel ratio command value, an optional fuel amount can be determined when the air amount is changed stepwise.

Since the basic fuel amount is determined according to the air amount and the engine speed when the position of the accelerator pedal changes to a position outside a predetermined range in a fixed period, the fuel can be fed at an appropriate fuel amount when the accelerator pedal is released or when the accelerator pedal is operated for sharp acceleration.

Since the gear changing operation is changed over between the gear changing pattern for lean-burn operation and the gear changing pattern for non-lean-burn operation, an optimum shift schedule can be designed according to the air-fuel ratio.

Since the gear changing operation and the lockup operation are executed according to the position of the accelerator pedal, the engine speed and the vehicle speed, the line pressure of the automatic transmission is determined on the basis of the position of the accelerator pedal and the engine speed while the engine is in a lean-burn operation, and so an optimum shift schedule, an optimum lockup schedule and an optimum line pressure can be determined even if the engine torque decreases during lean-burn operation.

Since the gear changing operation and the lockup operation are executed according to the position of the accelerator pedal and the vehicle speed, and the line pressure of the automatic transmission is determined on the basis of the position of the accelerator pedal in an engine in which the air amount changes when the air-fuel ratio changes, an optimum shift schedule, an optimum lockup schedule and an optimum line pressure can be determined even when the opening of the throttle valve does not correspond uniquely to the engine torque due to a change in the air amount resulting from a change of air-fuel ratio.

Since the air-fuel ratio command value is inhibited from specifying a lean air-fuel ratio when the temperature of the oil of the automatic transmission is lower than a predetermined temperature or when it is found that a part of the automatic transmission is out of order, a lean air-fuel ratio is not determined when the temperature of the oil of the automatic transmission is comparatively low or when the automatic transmission malfunctions.

DETAILED DESCRIPTION OF THE PREFERRED EMBODIMENTS

Preferred embodiments of the present invention will be described hereinafter with reference to the accompanying drawings.

Figure 1:
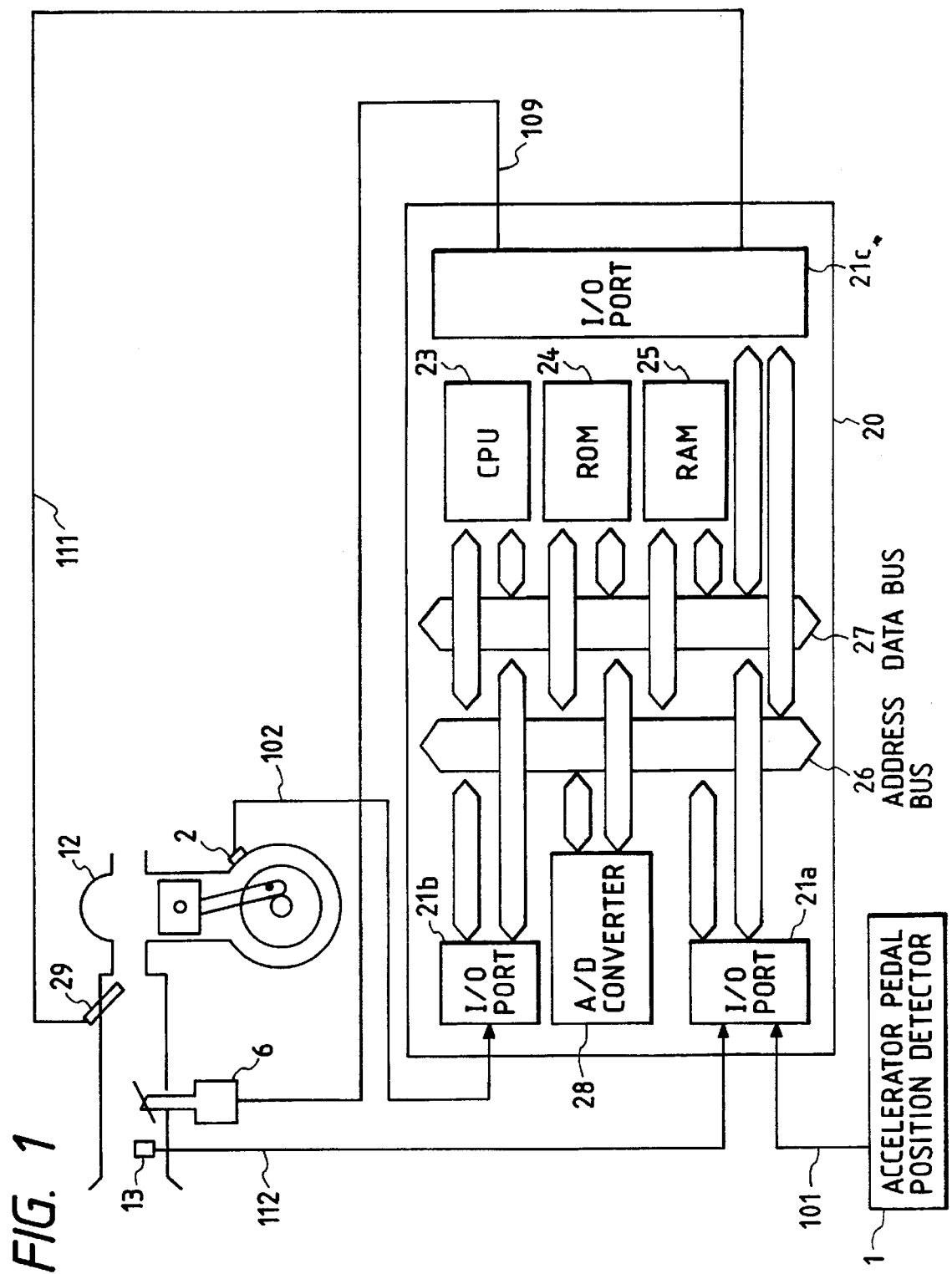
FIG. 1 is a block diagram showing an example of the overall configuration of the invention.

FIG. 1 shows an arrangement for illustrating a method in a first embodiment of the invention. The embodiment has a controller 20 which controls an engine 12 provided at least with an air amount detector 13, an air amount controlling actuator 6, an engine speed detector 2 and a fuel feed valve 29. The controller 20 comprises a CPU (Central Processing Unit) 23, a ROM (Read-Only Memory) 24, a RAM (Random Access Memory) 25, I/O (Input-Output) ports 21, an A/D (Analog to Digital) converter 28, an address bus 26 and a data bus 27. The controller 20 receives accelerator pedal position data 101, air amount data 112 and engine speed data 102, and executes procedures stored in the ROM 24 to give commands to the air amount controlling actuator 6 and the fuel feed valve 29. The present invention is featured by the procedures.

Figure 2:
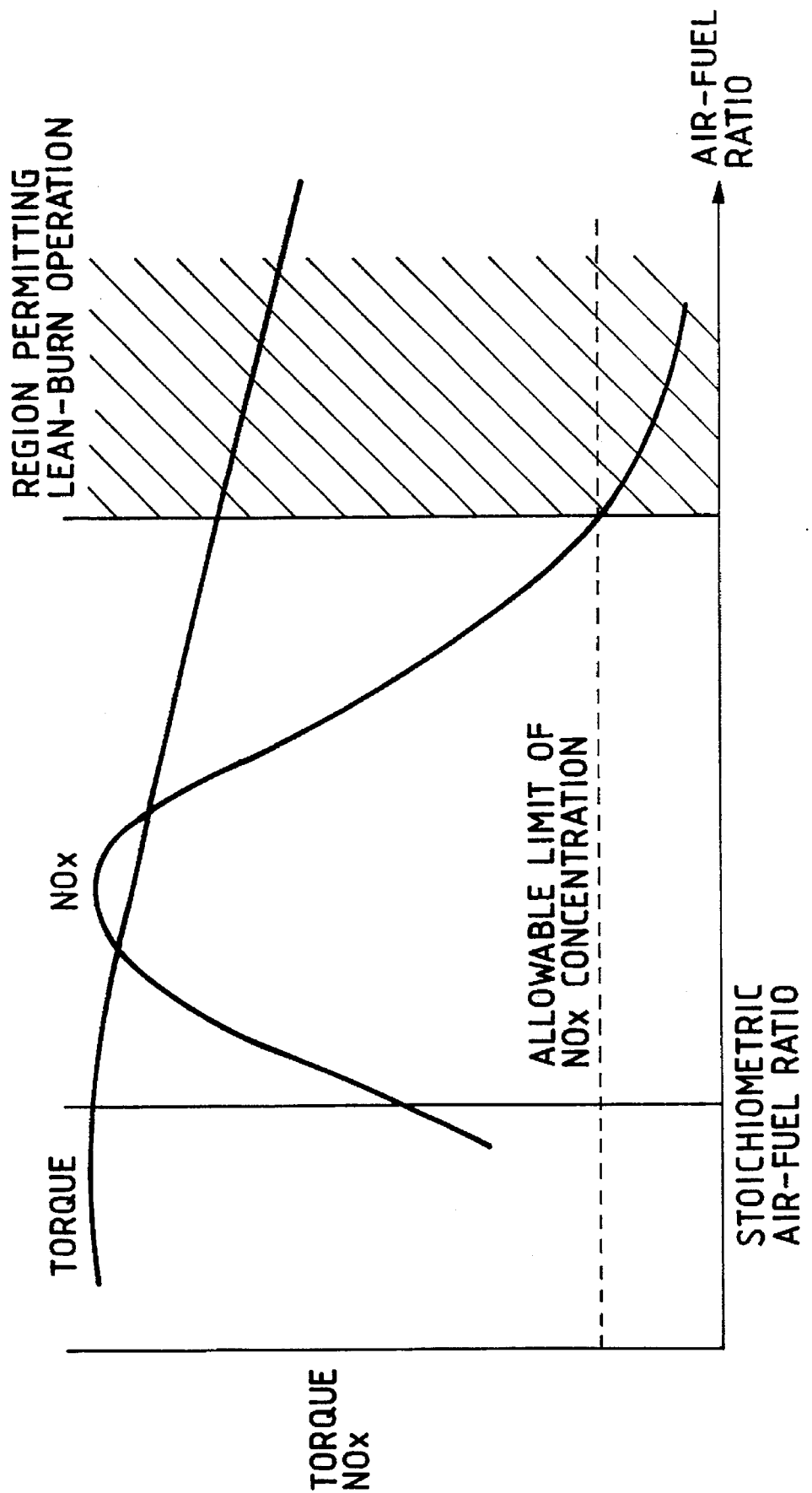
FIG. 2 is a graph showing relations of the engine torque, the NOx, and the air-fuel ratio.

FIG. 2 shows the relations between engine torque and air-fuel ratio and between a NOx (Nitrogen Oxide) and the air-fuel ratio. Since the fuel amount is reduced below that of a stoichiometric air-fuel ratio during operation at a lean air-fuel ratio, the engine torque decreases when the air-fuel ratio is increased with an opening of the throttle valve of the engine which has been kept fixed. Since the catalyst for reducing the NOx concentration in exhaust gas does not always function effectively in a state where the air-fuel ratio is other than the stoichiometric air-fuel ratio, a lean-burn operation of the engine is possible only at the air-fuel ratio that makes the NOx concentration of the exhaust gas lower than an allowable limit; that is, the transition of the air-fuel ratio between the stoichiometric air-fuel ratio and an air-fuel ratio for a lean-burn operation must be completed as quickly as possible to satisfy the requirements for the content of the exhaust gas, as apparent from FIG. 2.

It is desirable to use an automatic transmission in combination with such an engine to secure easy driving. The gear changing operation of the automatic transmission is controlled according to a shift schedule stored in a memory of the controller 20.

Figure 3:
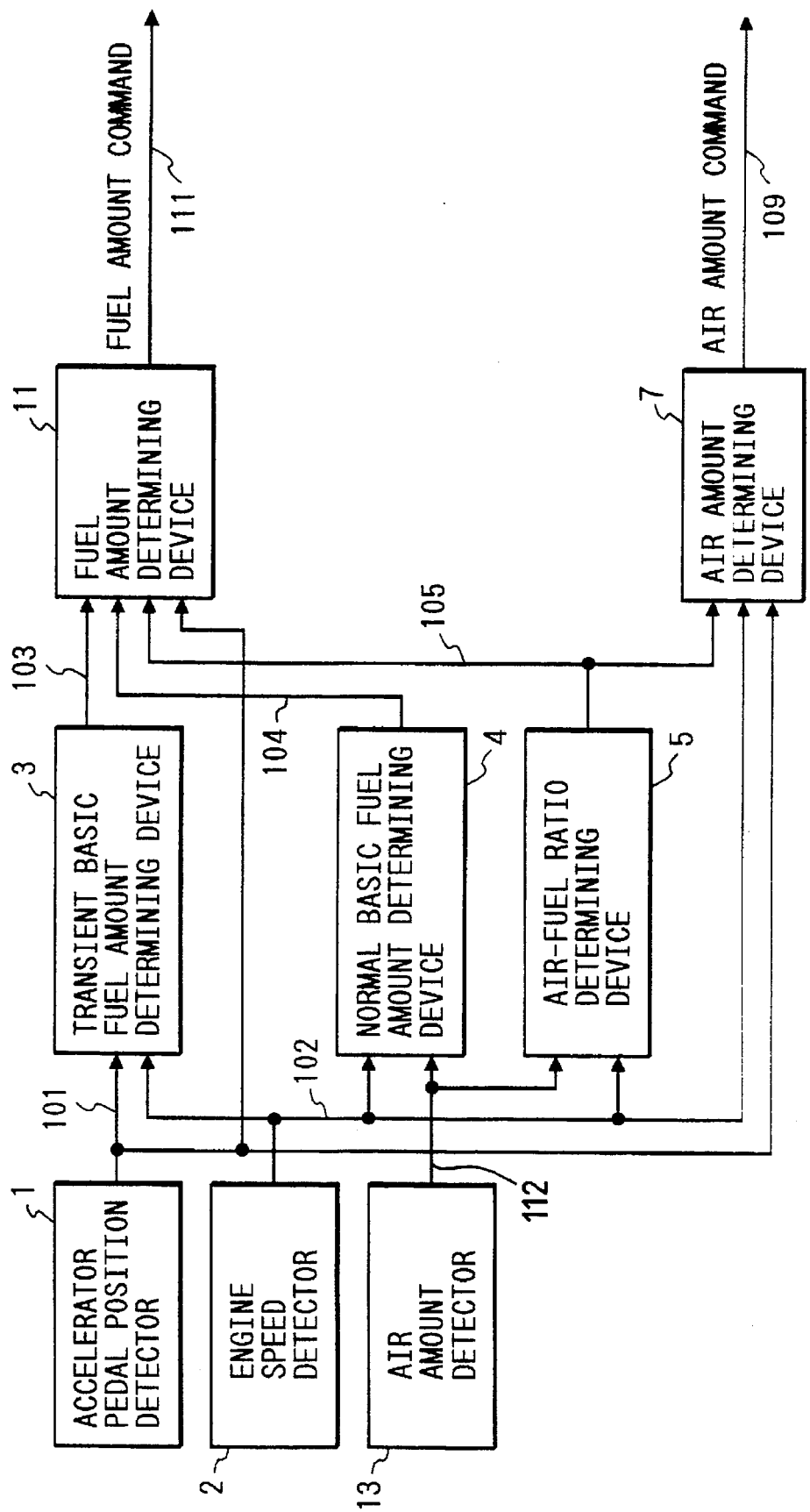
FIG. 3 is a signal block diagram for explaining a procedure of a first embodiment of the invention.

FIG. 3 is a signal block diagram for explaining the procedures of the first embodiment. A transient basic fuel amount determining device 3 calculates transient basic fuel amount data 103 for operation in an air-fuel ratio changing mode, using the accelerator pedal position data 101 provided by an accelerator pedal position detector 1 and the engine speed data 102 provided by the engine speed detector 2. A normal basic fuel amount determining device 4 calculates normal basic fuel amount data 104 for operation in a normal mode, using the air amount data 112 provided by the air amount detector 13 and the engine speed data 102 provided by the engine speed detector 2. An air-fuel ratio determining device 5 calculates an air-fuel ratio command value 105 using the air amount data 112 and the engine speed data 102. A fuel amount determining device 11 determines a fuel amount using the transient basic fuel amount data 103, the normal basic fuel amount data 104, the air-fuel ratio command value 105 and the accelerator pedal position data 101, and gives a command 111 to the fuel feed valve 29. An air amount determining device 7 calculates an air amount command value 109 using the accelerator pedal position data 101, the engine speed data 102 and the air-fuel ratio command value 105. The air amount determining device 7 controls the air amount controlling actuator 6 for controlling the air amount fed to the engine.

Figure 4:
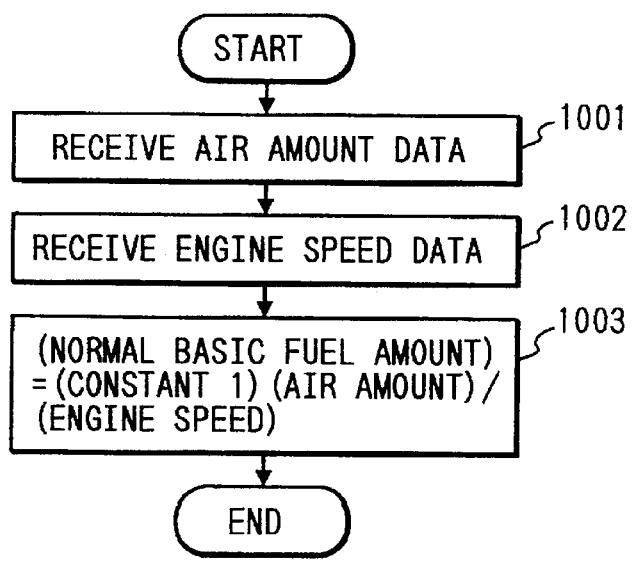
FIG. 4 is a flow chart of a procedure to be executed by a normal basic fuel amount determining device.

FIG. 4 shows a procedure to be executed by the normal basic fuel amount determining device 4. The normal basic fuel amount determining device 4 receives the air amount data 112 and the engine speed data 102, and then calculates the normal basic fuel amount data 104 by using following expression (1).

$$\text{(Normal basic fuel amount)} = \text{(Constant 1)} \times \text{(Air amount)/(Engine speed)} \qquad (1)$$

Figure 5:
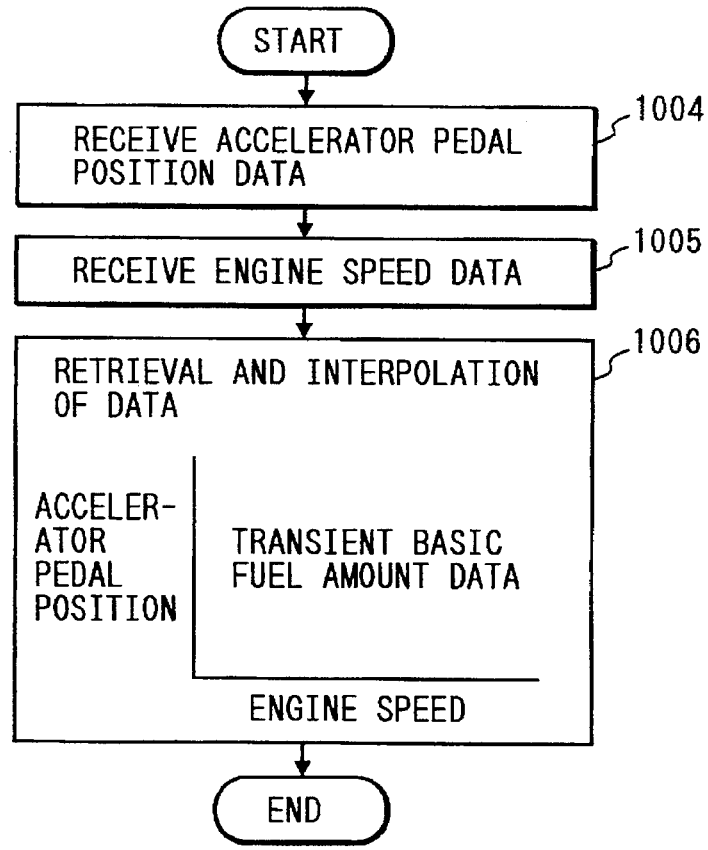
FIG. 5 is a flow chart of a procedure to be executed by a transient basic fuel amount determining device.

FIG. 5 shows a procedure to be executed by the transient basic fuel amount determining device 3. The transient basic fuel amount determining device 3 receives the accelerator pedal position data 101 in a step 1004 and the engine speed data 102 in a step 102, retrieves data previously stored in the controller 20 according to the accelerator pedal position data 101 and the engine speed data 1005 and interpolates the data to calculate the transient basic fuel amount data 103 in a step 1006. The data stored in the controller 20 is a relation between the engine speed data 102, the accelerator pedal position data 101 and the normal basic fuel amount data 104. This relation relates to a state where the air-fuel ratio is for a non-lean fuel mixture and the air amount controlling actuator 6 is controlled by the accelerator pedal position data 101. Therefore, the fuel amount immediately before the air-fuel ratio transition is equal to the fuel amount after the completion of the air-fuel ratio transition.

Figure 6:
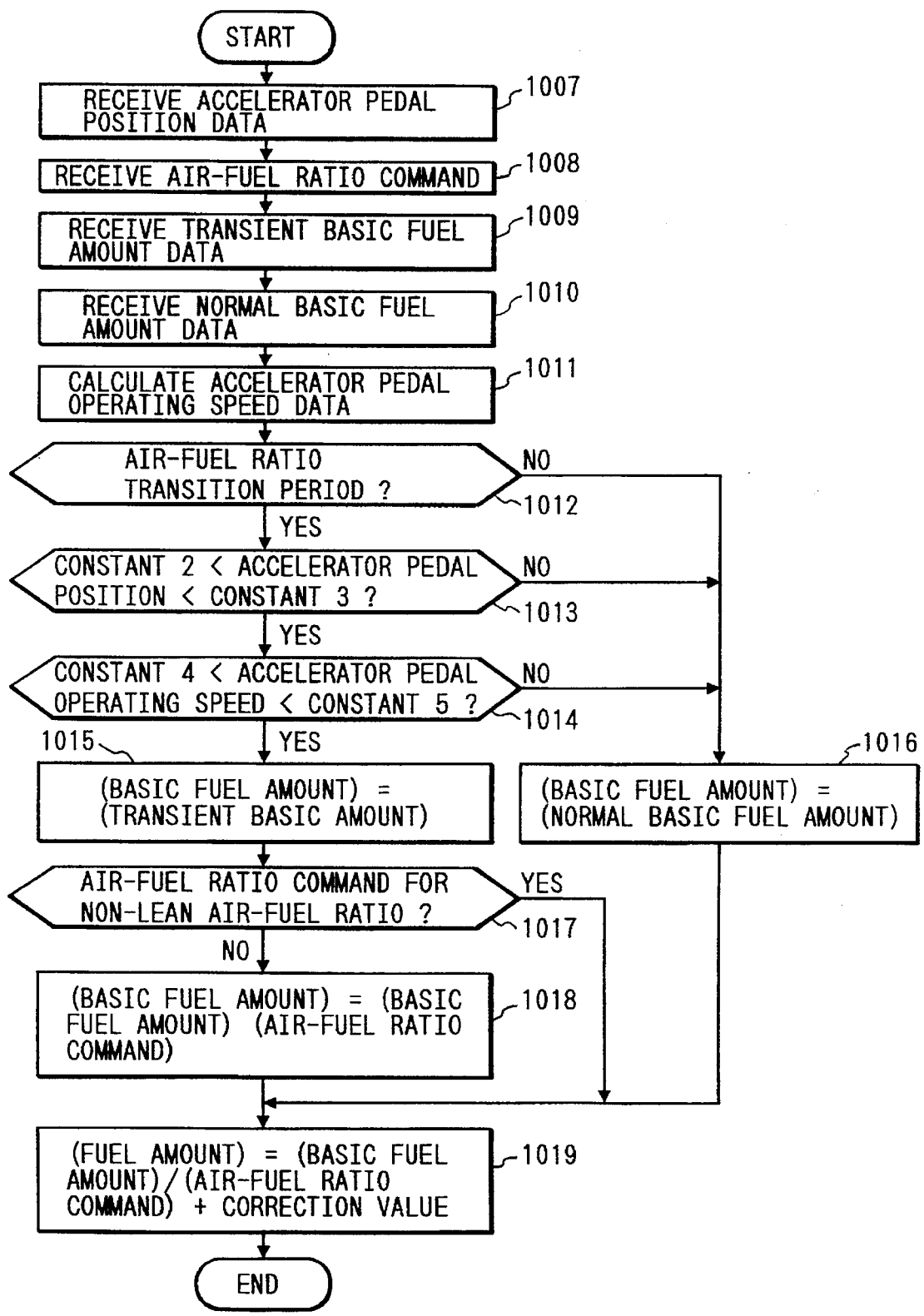
FIG. 6 is a flow chart of a procedure to be executed by a fuel amount determining device.

FIG. 6 shows a procedure to be executed by the fuel amount determining device 11. The fuel amount determining device 11 receives the accelerator pedal position data 101 in a step 1007, the air-fuel ratio command 105 in a step 1008, the transient basic fuel amount data 103 in a step 1009 and the normal basic fuel amount data 104 in a step 1010, and calculates accelerator pedal operating speed data using the accelerator pedal position data 101 in a step 1011. Suppose that a fixed period following the completion of change of the air-fuel ratio command value 105 from specifying a lean air-fuel ratio to specifying a non-lean air-fuel ratio, or from specifying a non-lean air-fuel ratio to specifying a lean air-fuel ratio, is an air-fuel ratio transition period. Then, in steps 1012 to 1014, if $$\text{Constant 2} < \text{Accelerator pedal position} < \text{Constant 3} \qquad (2)$$

and $$\text{Constant 4} < \text{Accelerator pedal operating speed} < \text{Constant 5} \qquad (3)$$

in the air-fuel ratio transition period, in a step 1015, $$\text{Basic fuel amount} = \text{Transient basic fuel amount} \qquad (4)$$

If not, in a step 1016, $$\text{Basic fuel amount} = \text{Normal basic fuel amount} \qquad (5)$$

In a step 1017, if the air-fuel ratio command value 105 specifies a non-lean air-fuel ratio after the step 1015, in a step 1018, $$\text{Basic fuel amount} = \text{Basic fuel amount} \times \text{Air-fuel ratio command value} \quad (6)$$

is calculated. The fuel amount data 111 is calculated by using the following expression in a step 1019.

$$\text{Fuel amount} = \quad (7)$$
$$\text{Basic fuel amount/air-fuel ratio command value} + \text{Correction value}$$

The correction value is an incremental air-fuel ratio for acceleration. The fuel amount is thus determined, so that the fuel amount during the air-fuel ratio transition is substantially equal to the fuel amount immediately before the air-fuel ratio transition and the variation of the engine torque is suppressed.

Figure 7:
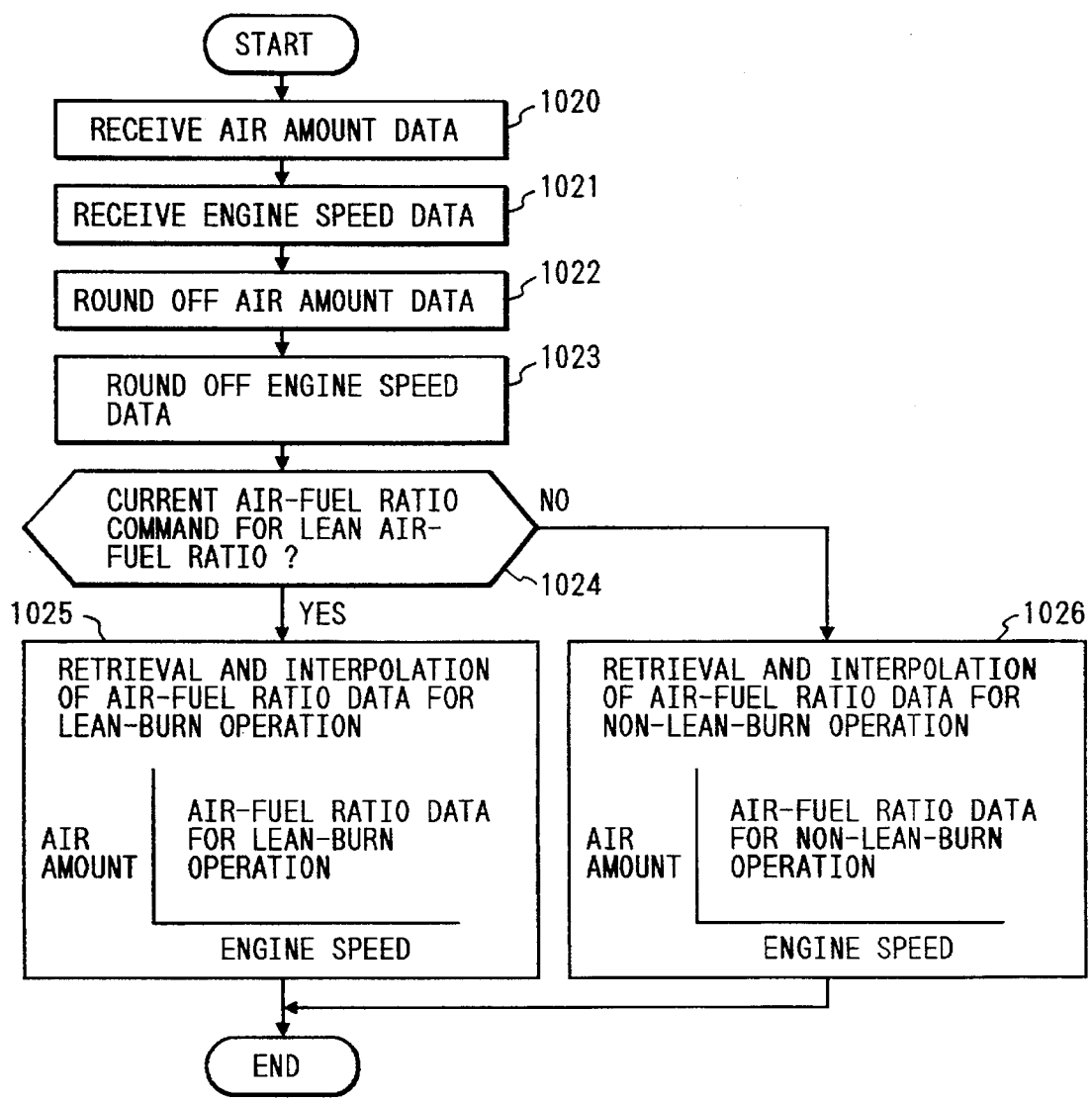
FIG. 7 is a flow chart of a procedure to be executed by an air-fuel ratio determining device.

FIG. 7 shows a procedure to be executed by the air-fuel ratio determining device 5. The air-fuel ratio determining device 5 receives the air amount data 112 in a step 1020 and the engine speed data 102 in a step 1021, and omits, raises or rounds off the received data to an optional place in steps 1022 and 1023. The rounded data is used for data retrieval to suppress the minute fluctuation of the air-fuel ratio. If the air-fuel ratio command value 105 calculated in the preceding calculation cycle specifies a lean air-fuel ratio in a step 1024, data for a lean-burn operation previously stored in the controller 20 is retrieved according to the rounded air amount data and the rounded engine speed data, and the data is interpolated to calculate an air-fuel ratio command value 105 in a step 1025. If the air-fuel ratio command value 105 calculated in the preceding calculation cycle specifies a non-lean air-fuel ratio in the step 1024, data for non-lean-burn operation previously stored in the controller is retrieved according to the rounded air amount data and the rounded engine speed data, and the data is interpolated to calculate an air-fuel ratio command value 105 in a step 1026.

Figure 8:
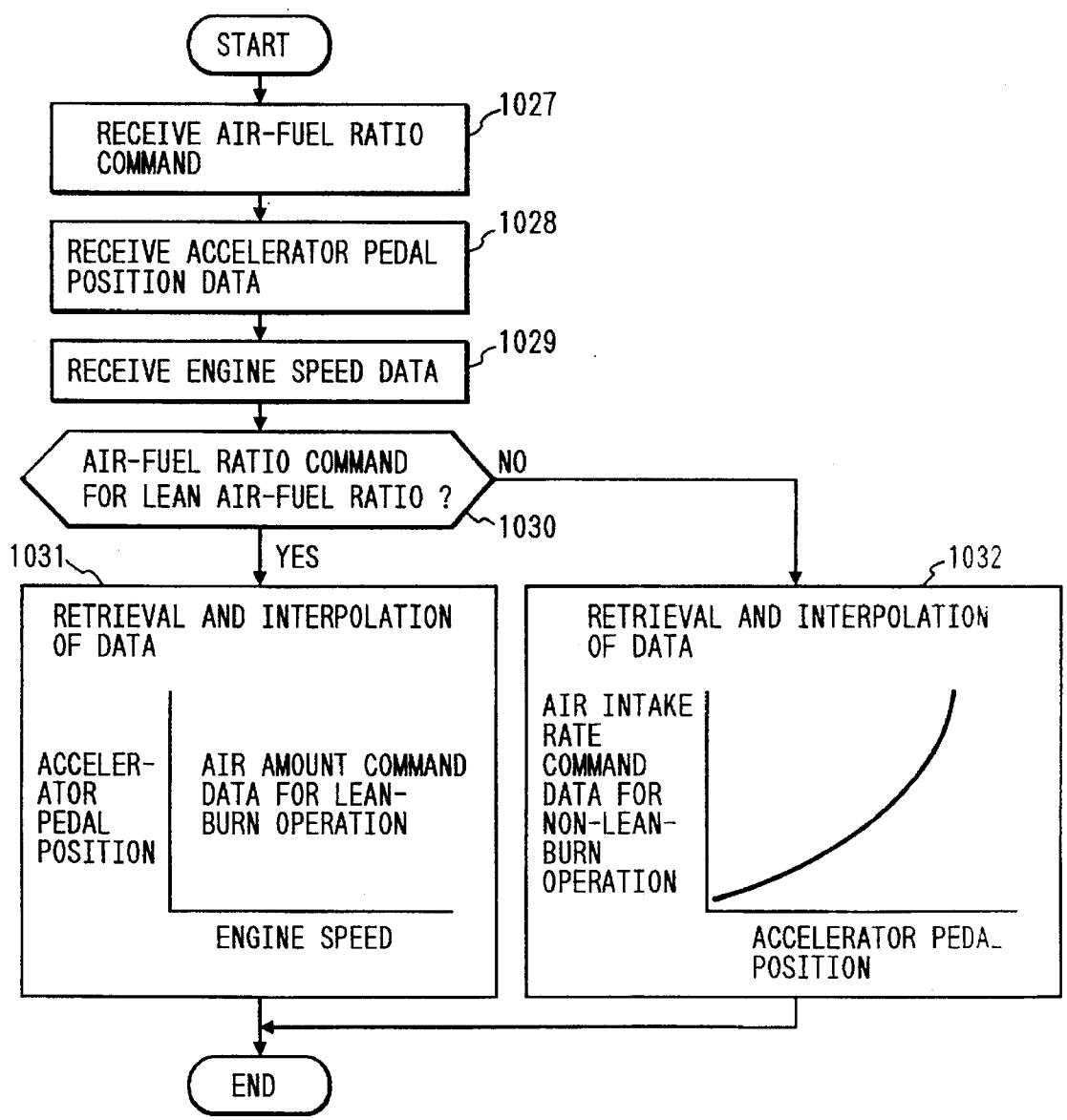
FIG. 8 is a flow chart of a procedure to be executed by an air amount determining device.

FIG. 8 shows a procedure to be executed by the air amount controlling actuator 6. The air amount controlling actuator 6 receives the air-fuel ratio command 105 in a step 1027, the accelerator pedal position data 101 in a step 1028 and the engine speed data 102 in a step 1029. If the air-fuel ratio command value 105 specifies the lean air-fuel ratio in a step 1030, air amount command data for lean-burn operation previously stored in the controller 20 is retrieved according to the accelerator pedal position data 101 and the engine speed data 102, and the air amount command data is interpolated to determine an air amount command value 109 in a step 1031. If the air-fuel ratio command value 105 specifies a non-lean air-fuel ratio in the step 1030, the air amount command data for non-lean-burn operation previously stored in the controller 20 is retrieved according to the accelerator pedal position data 101, and the air amount command data is interpolated to determine the air amount command value 109 in a step 1032. Thus, the fuel amount during the air-fuel ratio transition equals the fuel amount after the completion of the air-fuel ratio transition, so that the variation of the engine torque is suppressed.

Figure 9:
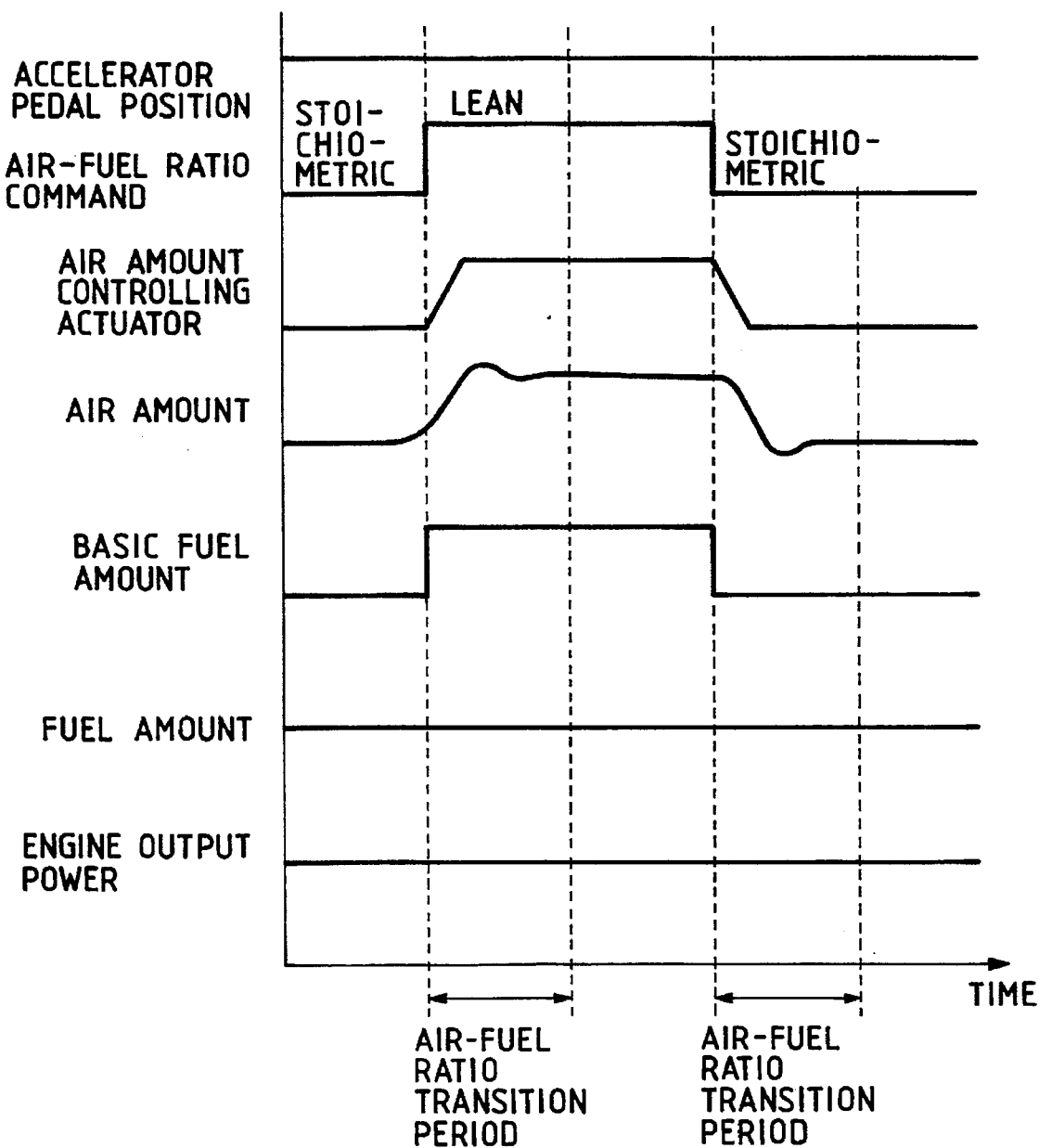
FIG. 9 is a time diagram for explaining the effect of the first embodiment.

FIG. 9 shows the effects of the first embodiment. When the air-fuel ratio command specifying the stoichiometric air-fuel ratio is changed stepwise to the level of the air-fuel ratio command specifying a lean air-fuel ratio with the accelerator pedal position fixed, the air amount controlling actuator operates with a short time lag in an opening direction and, consequently, the air amount increases. Since the air-fuel ratio increases, the basic fuel amount is incremented according to the expression (6) above mentioned and the fuel amount is reduced according to the expression (7) above mentioned, the output power of the engine and the engine torque are caused to change scarcely at all due to the air-fuel ratio transition. When the air-fuel ratio command changes stepwise from the air-fuel ratio command specifying a lean air-fuel ratio to the level of the air-fuel ratio command specifying the stoichiometric air-fuel ratio, the air amount controlling actuator operates with a short time lag in a closing direction and, consequently, the air amount is reduced. Since the air-fuel ratio decreases, the basic fuel amount is reduced according to the expression (4) above mentioned and the fuel amount is increased according to the expression (7) above mentioned, the output power of the engine and the engine torque are caused to change scarcely at all due to the air-fuel ratio transition. Therefore, the driver is able to drive the vehicle without being aware of any change in the air-fuel ratio at all.

Figure 10:
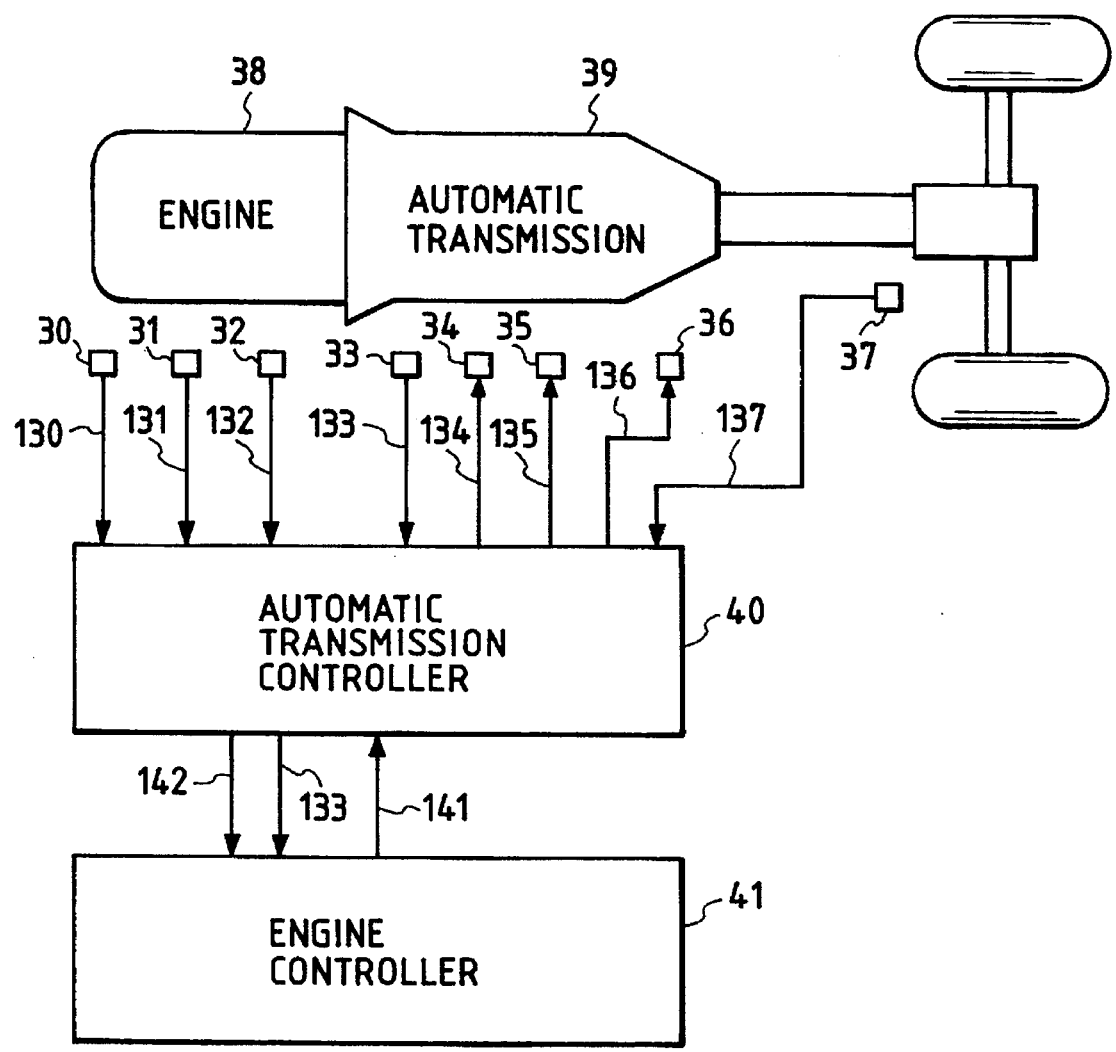
FIG. 10 is a block diagram showing an example of the overall configuration of a second embodiment of the invention.

FIG. 10 shows an arrangement for illustrating a method in a second embodiment according to the invention. The embodiment has an automatic transmission controller 40, an accelerator pedal position detector 30, a throttle valve opening detector 31, an engine speed detector 32, an oil temperature detector 33, a vehicle speed detector 37, a line pressure controlling actuator 34, a gear change controlling actuator 35, a lockup controlling actuator 36 and an engine controller 41. The automatic transmission controller 40 and the engine controller 41 are microcomputers and control an engine 38 and an automatic transmission 39. The automatic transmission controller 40 receives accelerator pedal position data 130, throttle valve opening data 131, engine speed data 132, oil temperature data 133, vehicle speed data 137 and an air-fuel ratio command value 141 and gives a line pressure command 134, a gear change command 135, a lockup command 136, the oil temperature data 133 and automatic transmission condition data 142. The air-fuel ratio command value 141 is provided by the engine controller 41. The oil temperature data 133 and the automatic transmission condition data 142 are obtained through the examination of the operating condition of the automatic transmission 39 to the engine controller 41. It is possible that the oil temperature data 133 may be applied directly to the engine controller 41 instead of being supplied through the automatic transmission controller 40 to the engine controller 41.

Figure 11:
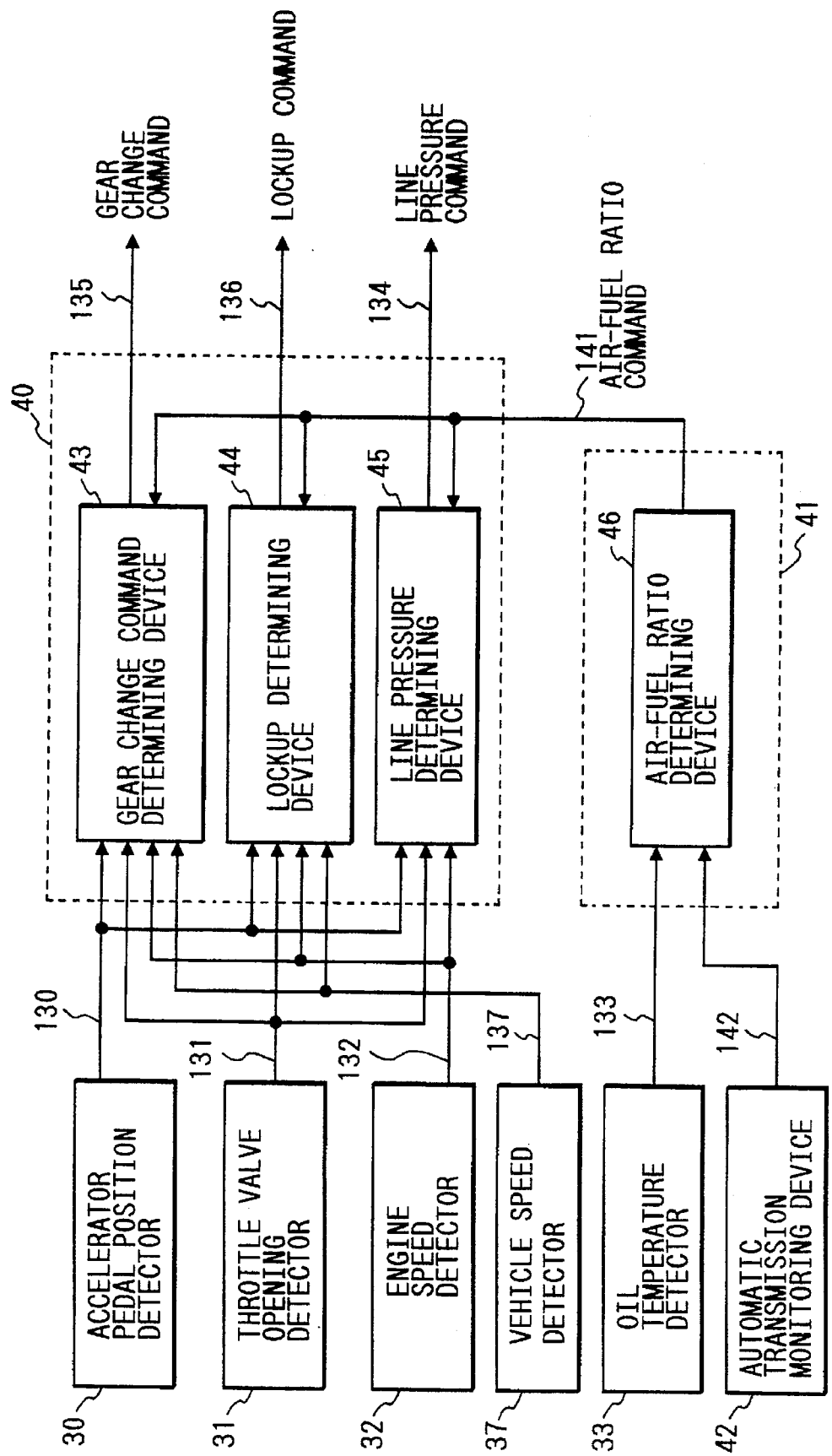
FIG. 11 is a signal block diagram for explaining a procedure to be executed by the second embodiment.

FIG. 11 shows a procedure to be executed by the second embodiment. The automatic transmission controller 40 comprises a gear change command determining device 43, a lockup command determining device 44 and a line pressure determining device 45. The gear change command determining device 43 determines a gear change ratio on the basis of the accelerator pedal position data 130 provided by the accelerator pedal position detector 30, the throttle valve opening data 131 provided by the throttle valve opening detector 31, the engine speed data 132 provided by the engine speed detector 32 and the vehicle speed data 137 provided by the vehicle speed detector 37, and provides the gear change command 135. The lockup determining device 44 decides whether or not lockup is to be performed on the basis of the accelerator pedal position data 130, the throttle valve opening data 131, the engine speed data 132 and the vehicle speed data 137, and provides the lockup command 136. The line pressure determining device 45 determines a line pressure on the basis of the accelerator pedal position data 130, the throttle valve opening data 131 and the engine speed data 132, and provides the line pressure command 134. An air-fuel ratio determining device 46 of the engine controller 41 determines an air-fuel ratio according to the condition of the engine 38, determines a final air-fuel ratio on the basis of the oil temperature data 133 provided by the oil temperature detector 33 and the automatic transmission condition data 142 provided by an automatic transmission monitoring device 42, and then supplies the air-fuel ratio command 141 to the automatic transmission controller 40.

Figure 12:
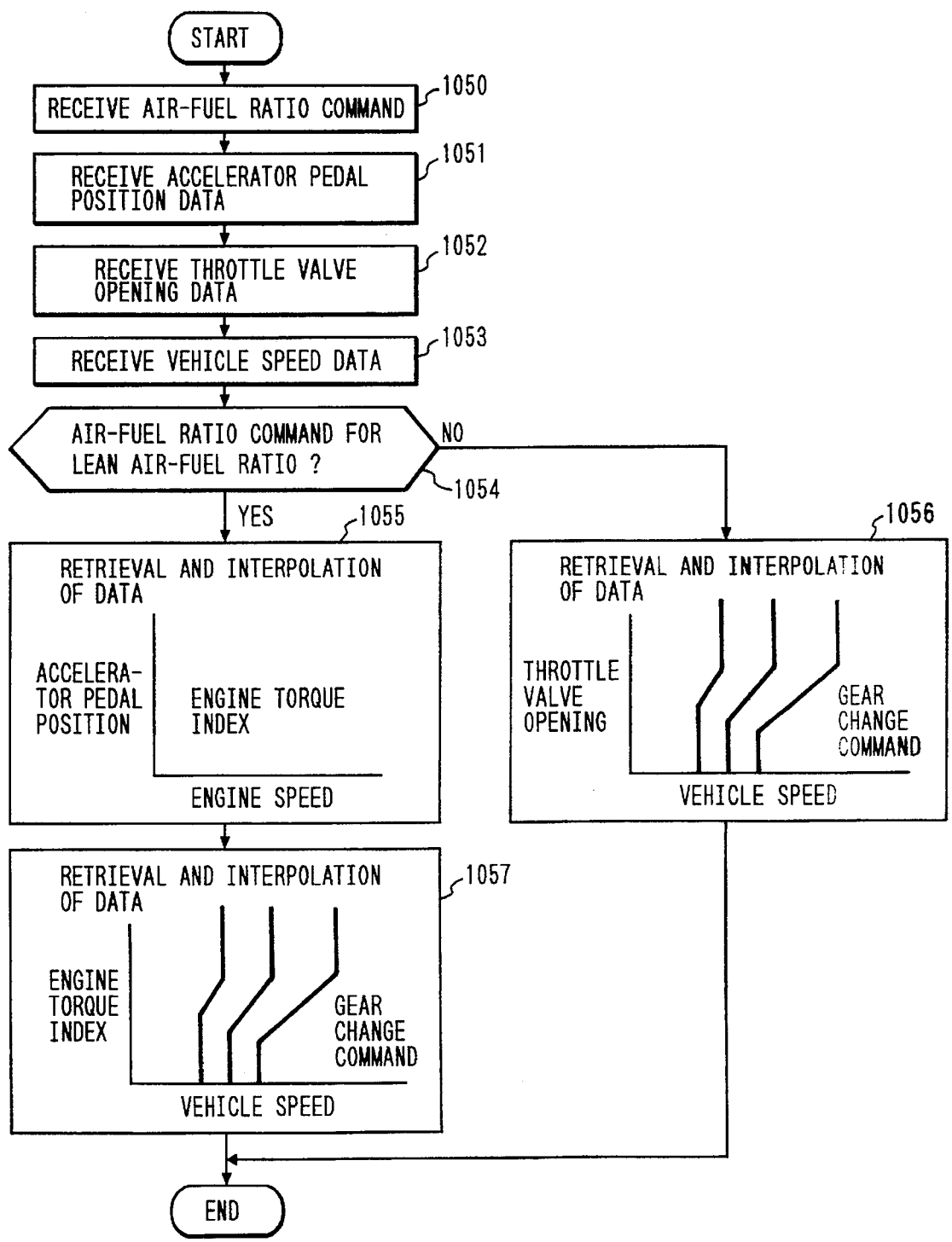
FIG. 12 is a flow chart of a first procedure to be executed by a gear change command determining device.

FIG. 12 shows a first procedure to be executed by the gear change command determining device 43. The first procedure is effective in improving the operability of a vehicle equipped with an engine incapable of varying the air amount according to the change of the air-fuel ratio. The gear change command determining device 43 receives the air-fuel ratio command 141 in a step 1050, the accelerator pedal position data 130 in a step 1051, the throttle valve opening data 131 in a step 1052 and the vehicle speed data 137 in a step 1053. If the air-fuel ratio command 141 specifies a non-lean air-fuel ratio in a step 1054, the gear change command determining device 43 retrieves gear changing data for a non-lean-burn operation previously stored in the controller 40 according to the throttle valve opening data 131 and the vehicle speed data 137, and interpolates the gear changing data to calculate the gear change command value 135 in a step 1056. If the air-fuel ratio command 141 specifies the lean air-fuel ratio in the step 1054, a gear change command determining device 43 retrieves data previously stored in the controller 40 according to the engine speed data 132 and the accelerator pedal position data 130, and interpolates the data to calculate an engine torque index in a step 1055. Thereafter, the gear change command determining device 43 retrieves gear change data for a lean-burn operation previously stored in the controller 40 according to the engine torque index and the vehicle speed data 137, and interpolates the gear change data to calculate the gear change command value 135 in a step 1057.

Figure 13:
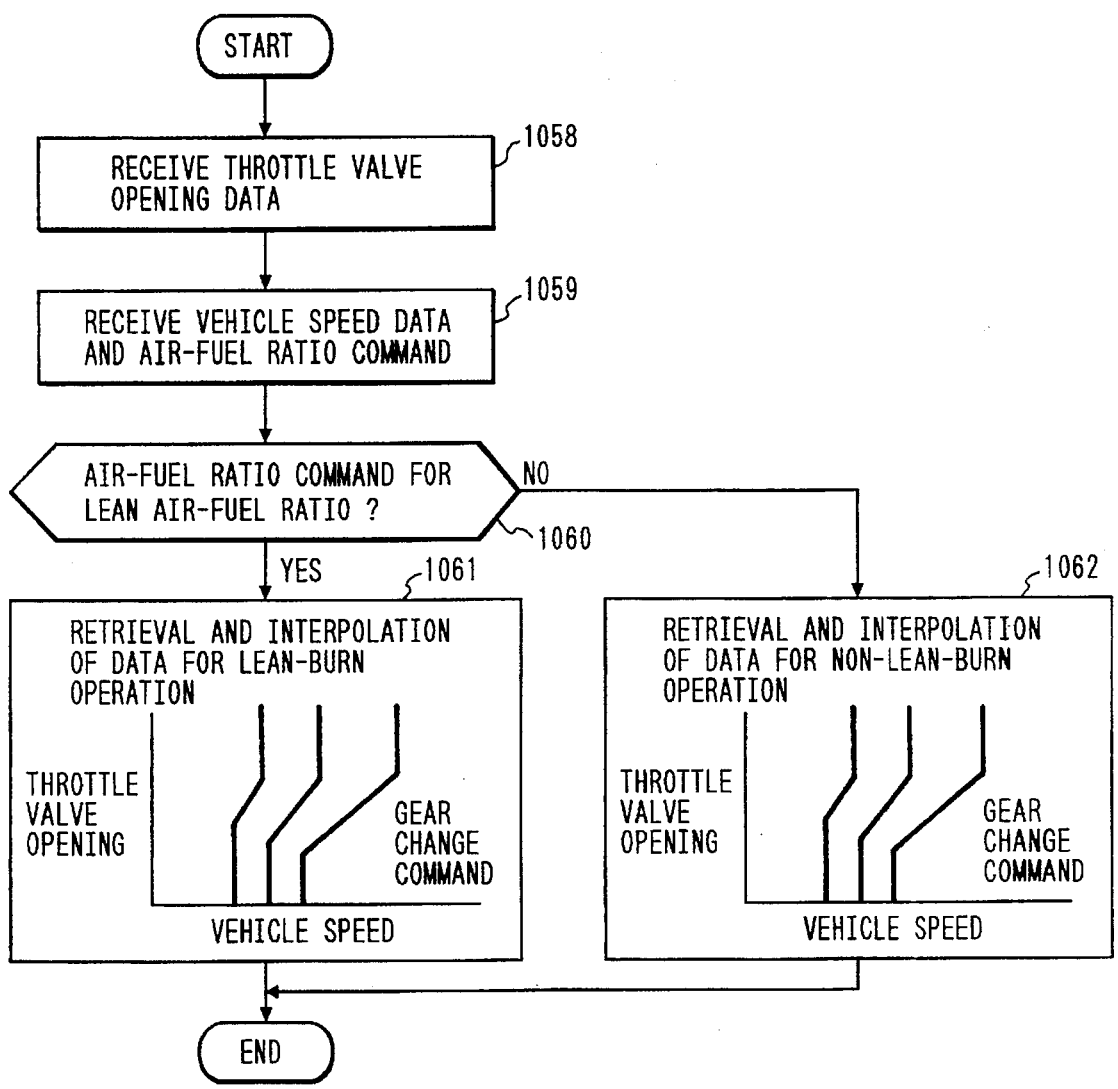
FIG. 13 is a flow chart of a second procedure to be executed by the gear change command determining device.

FIG. 13 shows a second procedure to be executed by the gear change command determining device 43. The second procedure is effective in improving the operability of a vehicle equipped with an engine incapable of varying the air amount according to the change of air-fuel ratio. Although the contents of the second procedure are simpler than those of the first procedure, the operability improving effect of the second procedure is somewhat inferior to that of the first procedure. The gear change command determining device 43 receives the throttle valve opening data 131 in a step 1058, the vehicle speed data 137 and the air-fuel ratio command in a step 1059. If the air-fuel ratio command 141 specifies a non-lean air-fuel ratio in a step 1060, the gear change command determining device 43 retrieves gear change data for a non-lean-burn operation previously stored in the controller 40 according to the throttle valve opening data 131 and the vehicle speed data 137, and interpolates the gear change data to calculate the gear change command value 135 in a step 1062. If the air-fuel ratio command 141 specifies a lean air-fuel ratio in the step 1060, the gear change command determining device 43 retrieves the gear change data for lean-burn operation previously stored in the controller 40 according to the throttle valve opening data 131 and the vehicle speed data 137, and interpolates the gear change data to calculate the gear change command value 135 in a step 1061.

Figure 14:
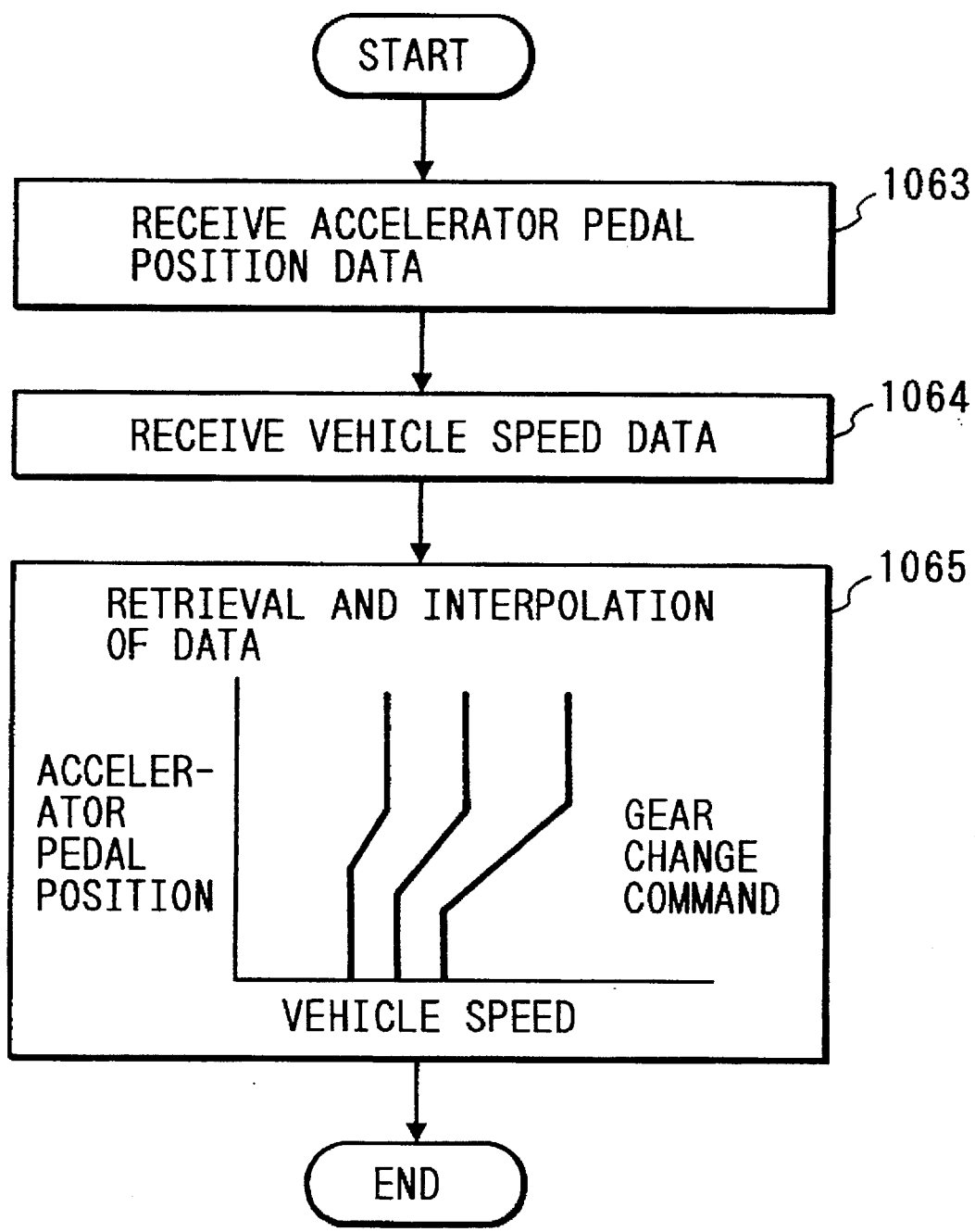
FIG. 14 is a flow chart of a third procedure to be executed by the gear change command determining device.

FIG. 14 shows a third procedure to be executed by the gear change command determining device 43. The third procedure is effective in improving the operability of a vehicle equipped with an engine, and which is similar to that described in connection with the first embodiment, capable of varying the air amount according to a change in the air-fuel ratio. The contents of the third procedure are simpler than those of the first procedure and the second procedure. Since the variation of the output power of the engine or the engine torque due to the change in the air-fuel ratio is suppressed on the engine side, the operability improving effect of the third procedure is far superior to those of the first procedure and the second procedure. For example, no trouble arises even if a gear changing operation an air-fuel ratio changing operation are performed simultaneously. The gear change command determining device 43 receives the accelerator pedal position data 130 in a step 1063 and the vehicle speed data 137 in a step 1064, retrieves the gear change data for non-lean-burn operation previously stored in the controller 40, and interpolates the gear change data to calculate the gear change command value 135 in a step 1065. In this procedure, any gear change data for lean-burn operation need not be stored in the controller 40 or memory, because the variation of the output power of the engine due to a change in the air-fuel ratio is suppressed on the engine side.

Figure 15:
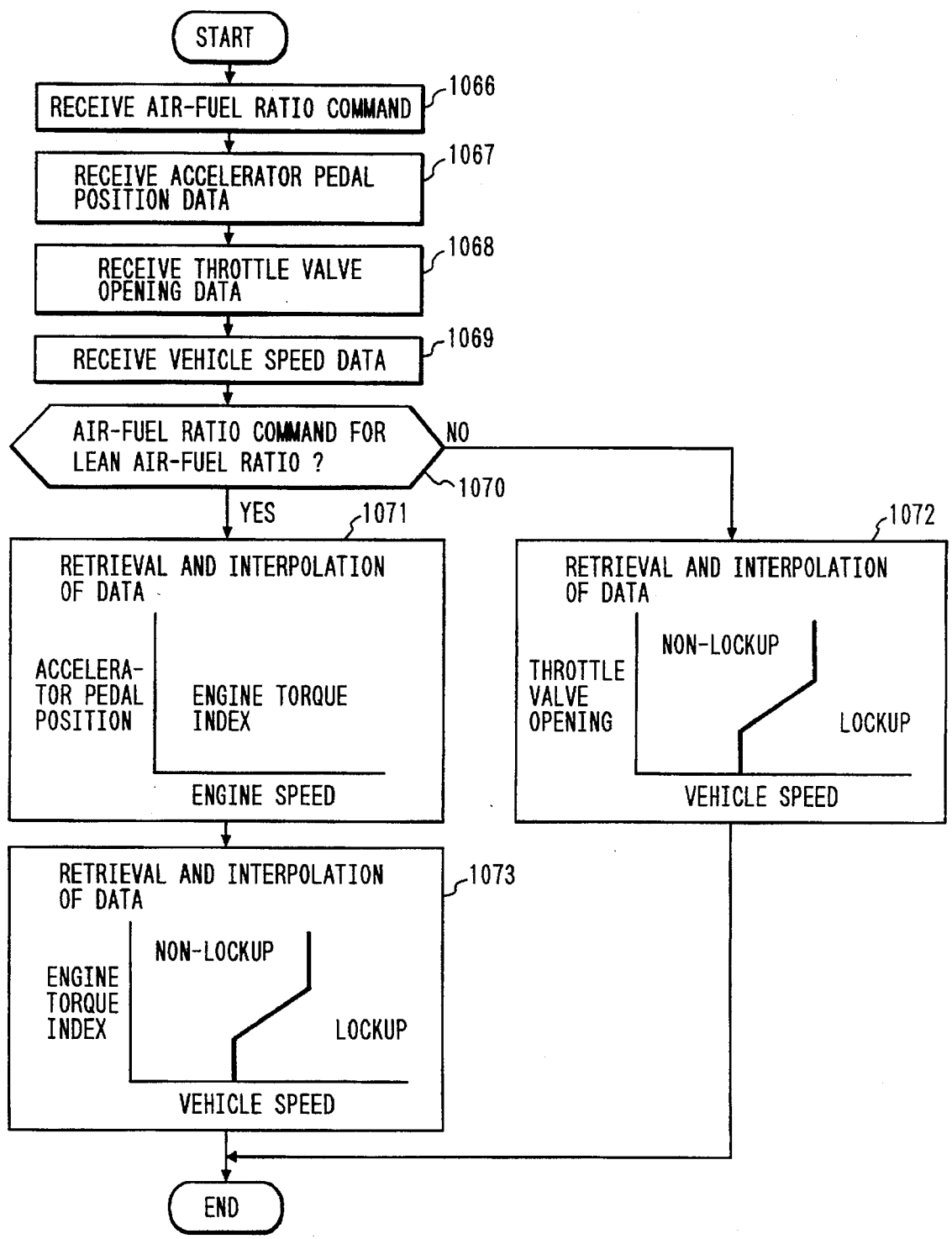
FIG. 15 is a flow chart of a first procedure to be executed by a lockup determining device.

FIG. 15 shows a first procedure to be executed by the lockup determining device 44. The first procedure is effective in improving the operability of a vehicle equipped with an engine incapable of varying the air amount according to a change in air-fuel ratio. The lockup determining device 44 receives the air-fuel ratio command 141 in a step 1066, the accelerator pedal position data 130 in a step 1067, the throttle valve opening data 131 in a step 1068 and the vehicle speed data 137 in a step 1069. If the air-fuel ratio command 144 specifies a non-lean air-fuel ratio in a step 1070, the lockup determining device 44 retrieves lockup data for a non-lean-burn operation previously stored in the controller 40 according to the throttle valve opening data 131 and the vehicle speed data 137, and interpolates the lockup data to calculate the lockup command value 136 in a step 1072. If the air-fuel ratio command 141 specifies a lean air-fuel ratio in the step 1070, the lockup determining device 44 retrieves the lockup data previously stored in the controller 40 according to the engine speed data 132 and the accelerator pedal position data 130, and interpolates the lockup data to calculate an engine torque index in a step 1071. Thereafter, the lockup determining device 44 retrieves the lockup data for a lean-burn operation previously stored in the controller 40 according to the engine torque index and the vehicle speed data 137, and then interpolates the lockup data to calculate the lockup command value 136 in a step 1073.

Figure 16:
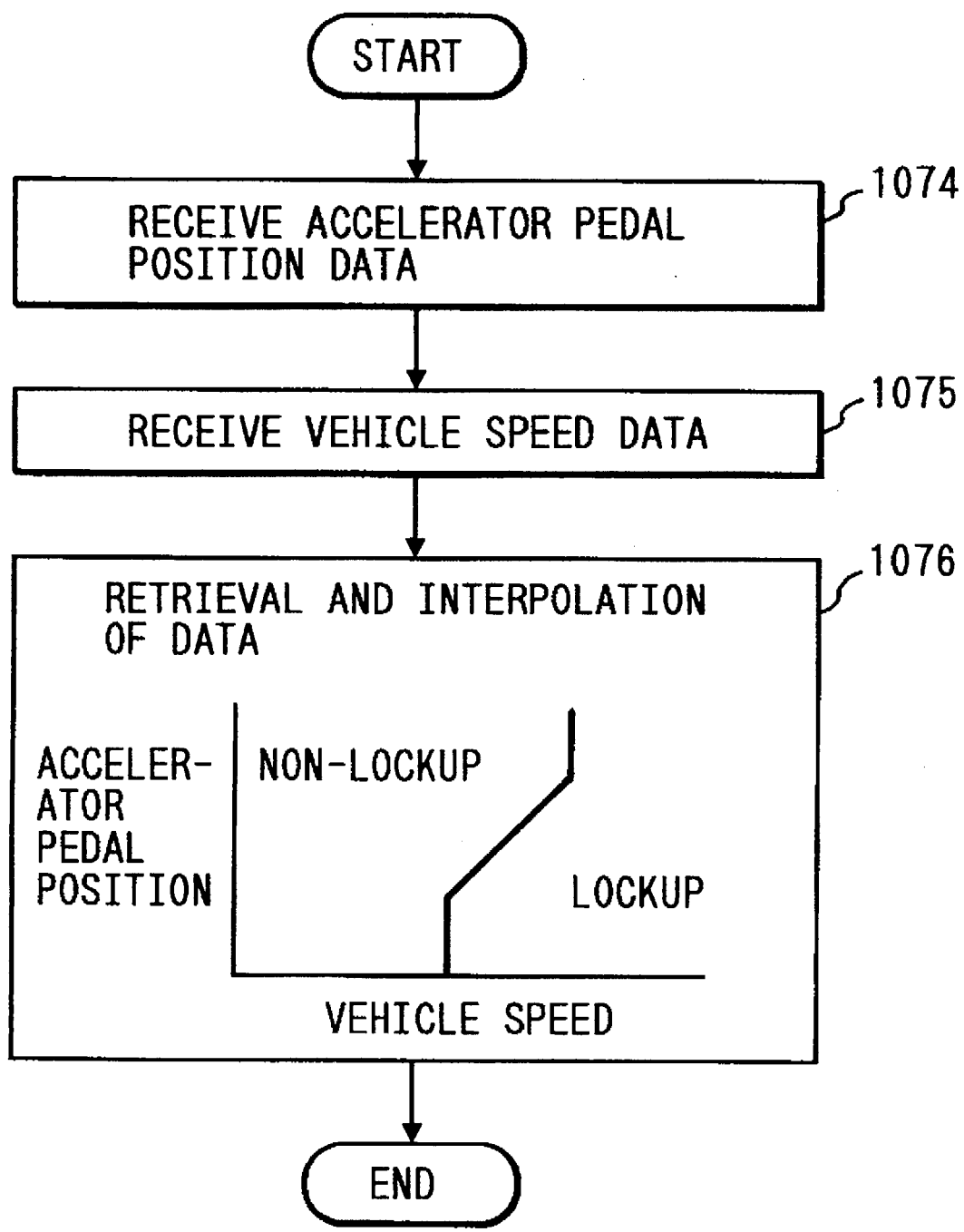
FIG. 16 is a flow chart of a second procedure to be executed by the lockup determining device.

FIG. 16 shows a second procedure to be executed by the lockup determining device 44. The second procedure is effective in improving the operability of a vehicle equipped with an engine, similar to that described in connection with a first embodiment, and which is capable of varying the air amount according to the change in the air-fuel ratio. The contents of the second procedure are simpler than those of the first procedure. Since the variation of the output power of the engine or the engine torque due to a change in the air-fuel ratio is suppressed on the engine side, the operability improving effect of the second procedure is far greater than that of the first procedure. For example, no trouble arises even if a lockup operation and an air-fuel ratio changing operation are performed simultaneously. The lockup determining device 44 receives the accelerator pedal position data 130 in a step 1074 and the vehicle speed data 137 in a step 1075, retrieves lockup data for non-lean-burn operation previously stored in the controller 40, and interpolates the lockup data to calculate the lockup command value 136 in a step 1076. Any data for lean-burn operation need not be stored in the controller 40 or memory, because the variation of the output power of the engine due to a change in the air-fuel ratio is suppressed by the engine side.

Figure 17:
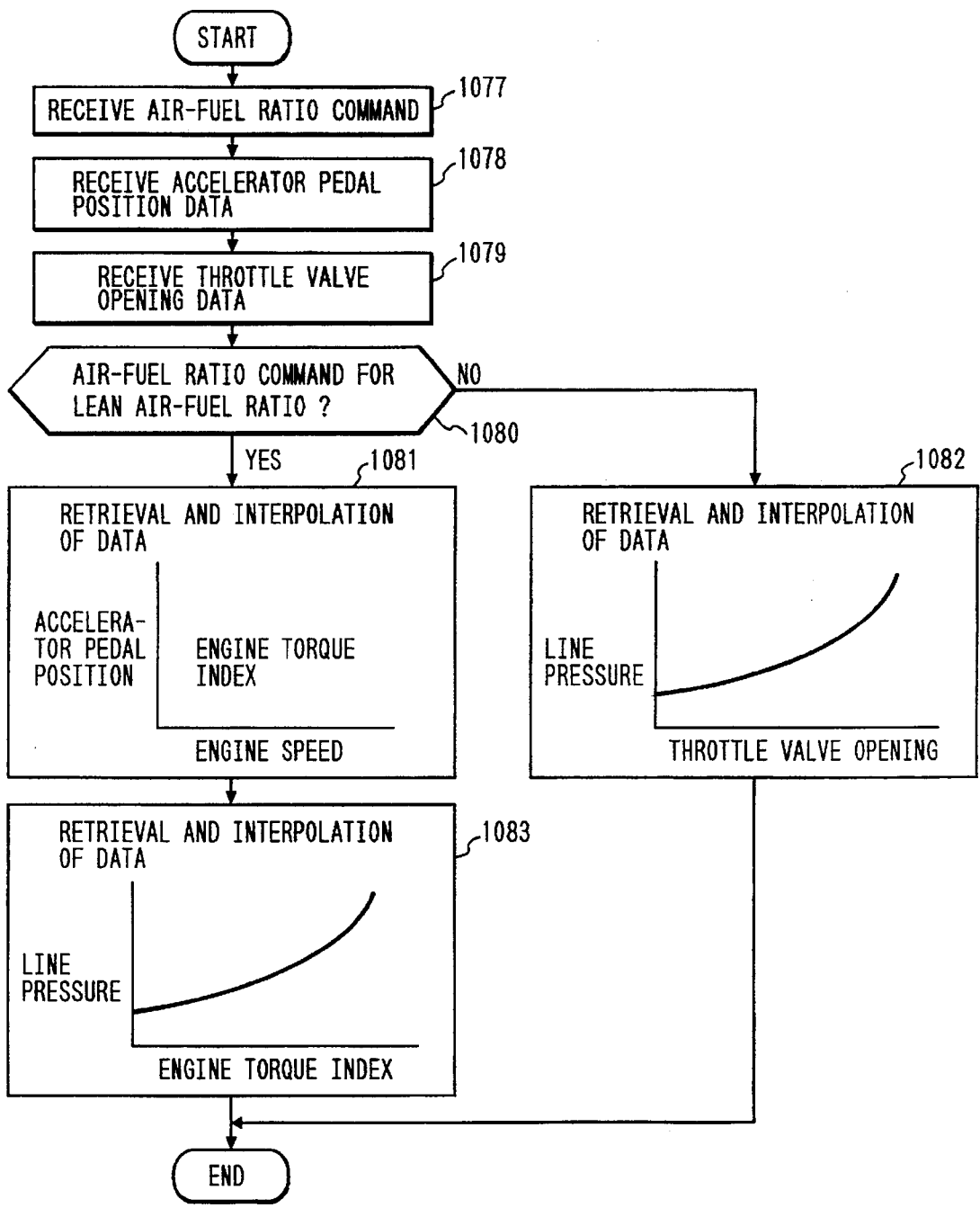
FIG. 17 is a flow chart of a first procedure to be executed by a line pressure command determining device.

FIG. 17 shows a first procedure to be executed by the line pressure determining device 45. The first procedure is effective in improving the operability of a vehicle equipped with an engine incapable of varying the air amount according to a change in the air-fuel ratio. The line pressure determining device 45 receives the air-fuel ratio command 141 in a step 1077, the accelerator pedal position data 130 in a step 1078 and the throttle valve opening data 131 in a step 1079. If the air-fuel ratio command 141 specifies a non-lean air-fuel ratio in a step 1080, the line pressure determining device 45 retrieves line pressure data for a non-lean-burn operation previously stored in the controller 40 according to the throttle valve opening data 131 and interpolates the line pressure data to calculate the line pressure command value 134 in a step 1082. If the air-fuel ratio command 141 specifies a lean air-fuel ratio in the step 1080, the line pressure determining device 45 retrieves data previously stored in the controller according to the engine speed data 132 and the accelerator pedal position data 130 and interpolates the data to calculate the engine torque index in a step 1081. Thereafter, the line pressure determining device 45 retrieves line pressure data for a lean-burn operation previously stored in the controller according to the engine torque index and interpolates the line pressure data to calculate the line pressure command value 134 in a step 1083.

Figure 18:
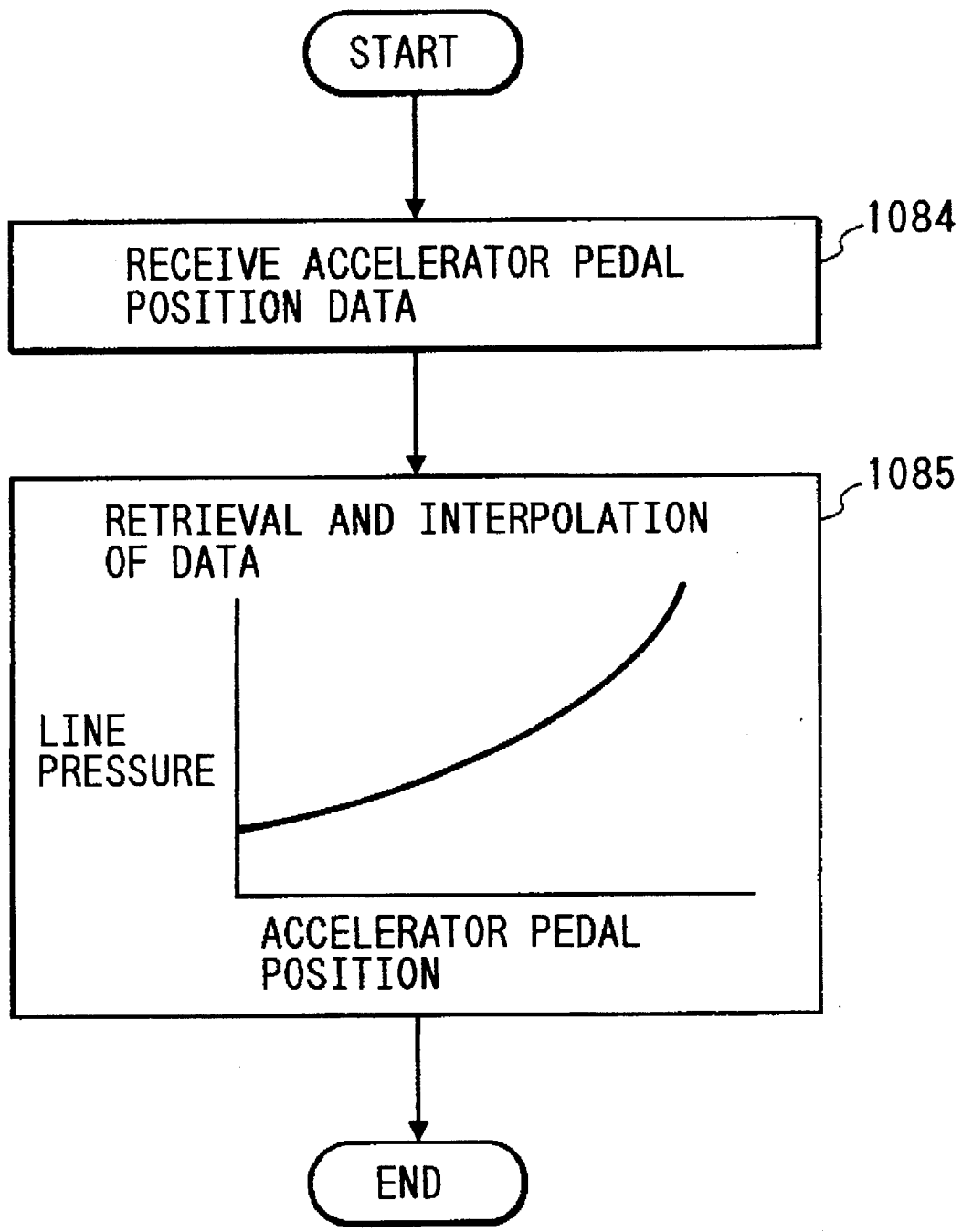
FIG. 18 is a flow chart of a second procedure to be executed by the line pressure command determining device.

FIG. 18 shows a second procedure to be executed by the line pressure determining device 45. The second procedure is effective in improving the operability of a vehicle equipped with an engine capable of varying the air amount according to a change in the air-fuel ratio. The contents of the second procedure are simpler than those of the first procedure. The line pressure determining device 45 receives the accelerator pedal position data 130 in a step 1084, retrieves line pressure data for a non-lean-burn operation previously stored in the controller 40, and interpolates the line pressure data to calculate the line pressure command value 134 in a step 1085. Any data for lean-burn operation need not be stored, because the variation of the output power of the engine or the engine torque due to a change in the air-fuel ratio is suppressed on the engine side.

Figure 19:
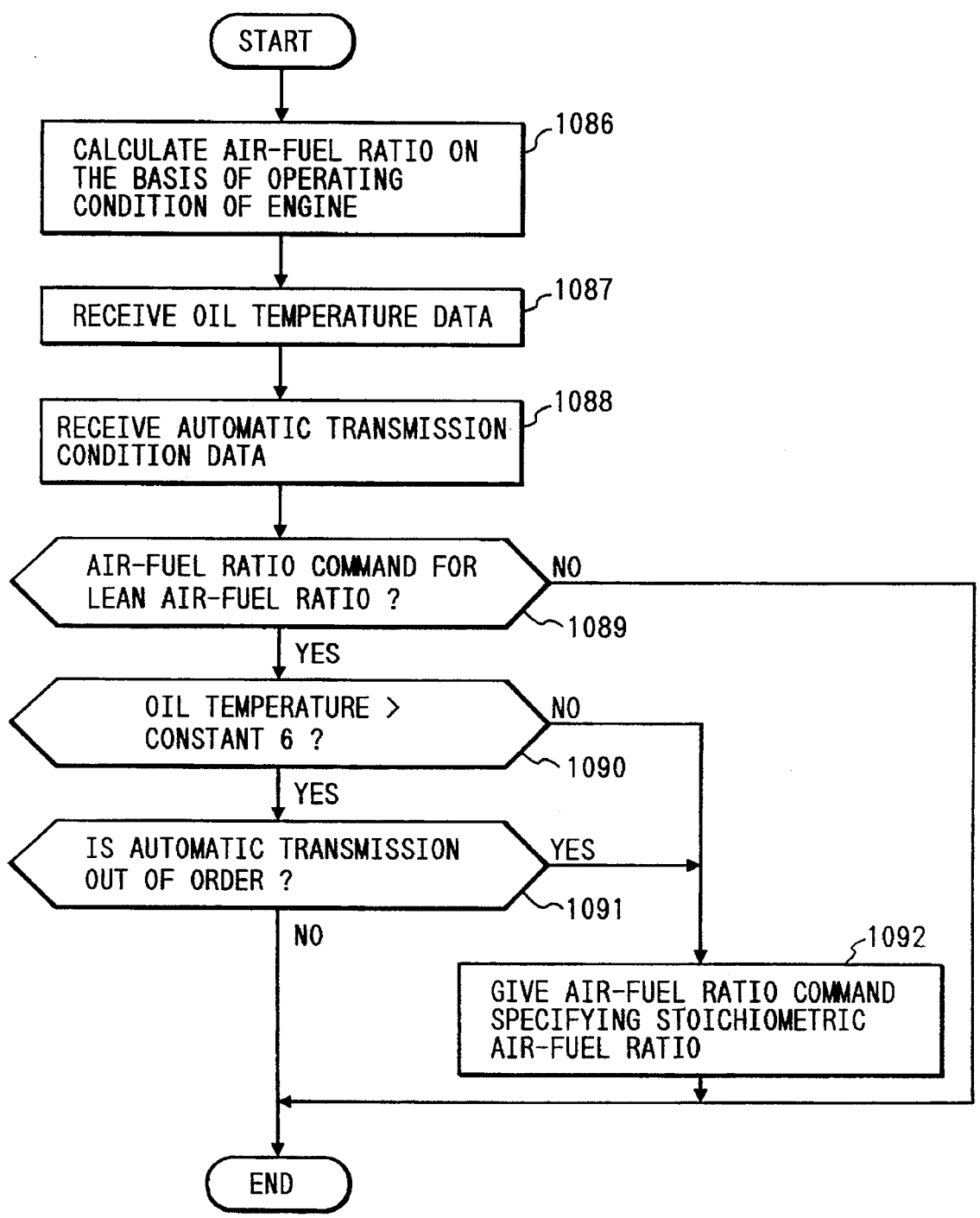
FIG. 19 is a flow chart of a procedure to be executed by an air-fuel ratio determining device.

FIG. 19 shows a procedure to be executed by the air-fuel ratio determining device 46. After calculating the air-fuel ratio on the basis of an operating condition of the engine in a step 1086, the air-fuel ratio determining device 46 receives the oil temperature data 133 representing the temperature of the oil of the automatic transmission and the automatic transmission condition data 142 in steps 1087 and 1088. If the air-fuel ratio command specifies a lean air-fuel ratio in a step 1089, and either of the following conditions (1) and (2) is satisfied in steps 1090 and 1091, an air-fuel ratio command specifying the stoichiometric air-fuel ratio is given to secure operability when the temperature of the automatic transmission is relatively low or the automatic transmission is out of order in a step 1092.

(1) Oil temperature≦Constant 6         (8)

(2) Part of the automatic transmission is out of order

As is apparent from the foregoing description, the present invention has the following effects.

1. Since the air-fuel ratio command value is varied stepwise during transition between the air-fuel ratio for a lean-burn operation and the stoichiometric air-fuel ratio, the air-fuel ratio can be quickly changed. Since the air amount fed to the engine is varied stepwise, the variation of the engine torque due to a change an air-fuel ratio can be suppressed without delay.

2. Since whether or not the current air-fuel ratio command value specifies a lean air-fuel ratio is taken into consideration when retrieving data for determining the air-fuel ratio, hunting between a lean air-fuel ratio and a non-lean air-fuel ratio due to a change in the basic fuel amount fed to the engine caused by a change in the air amount does not occur.

3. Since either the basic fuel amount or the engine speed or both the basic fuel amount and the engine speed are rounded off to an optional place before the retrieval and interpolation of data, the air-fuel ratio can be varied smoothly in a range for lean-burn operation, so that the combustion in the engine can be stabilized.

4. Since the air amount is controlled so that the fuel amount immediately before the transition between the air-fuel ratio for lean-burn operation and the stoichiometric air-fuel ratio equals the fuel amount after the completion of the transition, the engine torque remains constant regardless of the transition of the air-fuel ratio.

5. Since the air amount for lean-burn operation is determined by retrieving data previously stored in the controller according to the position of the accelerator pedal and the engine speed and the interpolation of the data and air amount for a non-lean-burn operation is determined uniquely according to the position of the accelerator pedal, the engine torque can be properly corrected at every operating point of the engine during lean-burn operation. The performance of the engine at every operating point is the same as that of an non-lean-burn engine, when a non-lean air-fuel ratio is specified.

6. Since the basic fuel amount is changed stepwise from a value determined on the basis of the air amount and the engine speed to a value determined on the basis of the position of the accelerator pedal and the engine speed for a fixed period following a stepwise change in the air-fuel ratio command value, an optional fuel amount can be determined when the air amount is changed stepwise. The fuel can be fed at the appropriate fuel amount when the accelerator pedal is released or when the accelerator pedal is operated for sharp acceleration, because the basic fuel amount is determined according to the air amount and the engine speed when the position of the accelerator pedal changes to the position outside the predetermined range in the fixed period.

7. An optimum shift schedule can be designed according to the air-fuel ratio, because the gear changing operation is changed over between the gear changing pattern for a lean-burn operation and the gear changing pattern for a non-lean-burn operation.

8. The optimum shift schedule, the optimum lockup schedule and the optimum line pressure can be determined even if the engine torque decreases during a lean-burn operation, because the gear changing operation and the lockup operation are executed according to the position of the accelerator pedal, the engine speed and the vehicle speed, and the line pressure of the automatic transmission is determined on the basis of the position of the accelerator pedal and the engine speed while the engine is in a lean-burn operation.

9. The optimum shift schedule, the optimum lockup schedule and the optimum line pressure can be determined even when the opening of the throttle valve does not correspond uniquely to the engine torque due to a variation in the air amount resulting from a change in the air-fuel ratio, because the gear changing operation and the lockup operation are executed according to the position of the accelerator pedal and the vehicle speed, and the line pressure of the automatic transmission is determined on the basis of the position of the accelerator pedal in the engine which changes the air amount when the air-fuel ratio is changed.

What is claimed is:

1. An engine power train control method for a vehicle having an engine and an automatic transmission, comprising the step of:

determining a fuel amount fed to the engine according to a position of an accelerator pedal of the vehicle and an engine speed of the engine for a fixed period during a transition between a first air-fuel ratio for a lean-burn operation and a second air-fuel ratio for a non-lean-burn operation of the engine.

2. An engine power train control method according to claim 1, further comprising the step of:

inhibiting said determining of said fuel amount when the position of the accelerator pedal is nearer to a free position than to a predetermined position during said fixed period.

3. An engine power train control method according to claim 1, further comprising the step of:

inhibiting said determining of said fuel amount when the position of the accelerator pedal is farther from a free position than to a predetermined position during said fixed period.

4. An engine power train control method according to claim 1, further comprising the step of:

inhibiting said determining of said fuel amount when an operating speed of the accelerator pedal is lower than a predetermined value during said fixed period.

5. An engine power train control method according to claim 1, further comprising the step of:

inhibiting said determining of said fuel amount when an operating speed of the accelerator pedal is higher than a predetermined value during said fixed period.

6. An engine power train control method according to claim 1, further comprising the step of determining both an air amount and the fuel amount fed to the engine according to the position of the accelerator pedal during a transition between the first air-fuel ratio and the second air-fuel ratio.

7. An engine power train control method for a vehicle having an engine and an automatic transmission, comprising the step of:

determining at least one of a first air amount fed to the engine and a first fuel amount fed to the engine after completion of a transition of an air-fuel ratio, based on at least one of a second air amount fed to the engine and a second fuel amount fed to the engine immediately before the transition of the air-fuel ratio between a first air-fuel ratio for lean-burn operation and a second air-fuel ratio for non-lean-burn operation of the engine.

8. An engine power train control method according to claim 7, wherein said first air amount and said first fuel amount are determined so that the second fuel amount immediately before the transition of the air-fuel ratio is equal to the first fuel amount after the completion of the transition of the air-fuel ratio during transition between a first air-fuel ratio for lean-burn operation and a second air-fuel ratio for non-lean-burn operation of the engine.

9. An engine power train control method according to claim 7, wherein the determination of the first air amount and the first fuel amount is done in accordance with a position of an accelerator pedal of the vehicle.

10. An engine power train control method for a vehicle having an engine and an automatic transmission, comprising the step of:

changing a command value specifying an air-fuel ratio of the engine stepwise during transition between a first air-fuel ratio for lean-burn operation and a second air-fuel ratio for non-lean-burn operation.

11. An engine power train control method according to claim 10, further comprising the step of:

changing a basic fuel amount fed to the engine stepwise from a first value, determined according to an air amount fed to the engine and an engine speed of the engine, to a second value, determined according to a position of an accelerator pedal of the vehicle and the engine speed during transition between a first air-fuel ratio for lean-burn operation and a second air-fuel ratio for non-lean-burn operation.

12. An engine power train control method according to claim 10, further comprising the step of:

changing an air amount command value, given to an air amount controlling an actuator, for controlling the air amount fed to the engine stepwise, and simultaneously changing said command value specifying an air-fuel ratio stepwise during transition between a first air-fuel ratio for lean-burn operation and a second air-fuel ratio for non-lean-burn operation.

13. An engine power train control method according to claim 12, wherein said air amount command value is determined by retrieving data previously stored in a controller using the position of the accelerator pedal and the engine speed when the air-fuel ratio command specifies a first air-fuel ratio for lean-burn operation, or according to only the position of the accelerator pedal when the air-fuel ratio command specifies a second air-fuel ratio for a non-lean-burn operation.

14. An engine power train control apparatus for a vehicle having an engine and an automatic transmission, comprising:

determining means for determining a fuel amount fed to the engine according to a position of an accelerator pedal of the vehicle and an engine speed of the engine for a fixed period during transition between a first air-fuel ratio for lean-burn operation and a second air-fuel ratio for non-lean-burn operation of the engine.

15. An engine power train control apparatus according to claim 14, further comprising:

inhibiting means for inhibiting said determining of said fuel amount when the position of the accelerator pedal is nearer to a free position than to a predetermined position during said fixed period.

16. An engine power train control apparatus according to claim 14, further comprising:

inhibiting means for inhibiting said determining of said fuel amount when the position of the accelerator pedal is farther from a free position than from a predetermined position during said fixed period.

17. An engine power train control apparatus according to claim 14, further comprising:

inhibiting means for inhibiting said determining of said fuel amount when an operating speed of the accelerator pedal is lower than a predetermined value during said fixed period.

18. An engine power train control apparatus according to claim 14, further comprising:

inhibiting means for inhibiting said determining of said fuel amount when an operating speed of the accelerator pedal is higher than a predetermined value during said fixed period.

19. An engine power train control apparatus for a vehicle having an engine and an automatic transmission, comprising:

determining means for determining at least one of a first air amount fed to an engine of the vehicle and a first fuel amount fed to the engine after a completion of a transition of an air-fuel ratio based on at least one of a second air amount fed to the engine and a second fuel amount fed to the engine immediately before the transition of the air-fuel ratio during transition between a first air-fuel ratio for lean-burn operation and a second air-fuel ratio for non-lean-burn operation of the engine.

20. An engine power train control apparatus according to claim 19, wherein said determining means determines the first air amount and the first fuel amount so that the second fuel amount immediately before the transition of the air-fuel ratio is equal to the first fuel amount after the completion of the transition of the air-fuel ratio during transition between a first air-fuel ratio for lean-burn operation and a second air-fuel ratio for non-lean-burn operation of the engine.

\* \* \* \* \*